United States Patent
Northam et al.

(10) Patent No.: US 11,988,064 B2
(45) Date of Patent: May 21, 2024

(54) MANAGED PRESSURE DRILLING CONTROL SYSTEM WITH CONTINUOUSLY VARIABLE TRANSMISSION

(71) Applicant: WEATHERFORD TECHNOLOGY HOLDINGS, LLC, Houston, TX (US)

(72) Inventors: Paul R. Northam, Houston, TX (US); Walter S. Dillard, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 17/479,032

(22) Filed: Sep. 20, 2021

(65) Prior Publication Data

US 2022/0003072 A1    Jan. 6, 2022

Related U.S. Application Data

(63) Continuation-in-part of application No. 15/375,409, filed on Dec. 12, 2016, now Pat. No. 11,131,156.

(51) Int. Cl.
*E21B 34/02* (2006.01)
*E21B 21/10* (2006.01)
(Continued)

(52) U.S. Cl.
CPC ............ *E21B 34/025* (2020.05); *E21B 21/10* (2013.01); *E21B 34/16* (2013.01); *F16K 31/047* (2013.01); *E21B 21/08* (2013.01); *E21B 2200/02* (2020.05)

(58) Field of Classification Search
CPC .... E21B 21/08; E21B 44/00; E21B 2021/006; E21B 21/00; E21B 21/0085;
(Continued)

(56) References Cited

U.S. PATENT DOCUMENTS 3,747,618 A    7/1973   Boes
3,952,577 A    4/1976   Hayes et al.
(Continued)

FOREIGN PATENT DOCUMENTS

CN    102374960 A    3/2012
EP    3376083 A1     9/2018
(Continued)

OTHER PUBLICATIONS

International Search Report issued Mar. 2, 2018 for PCT Patent Application No. PCT/US2017/064552, 4 pages.
(Continued)

*Primary Examiner* — George S Gray
(74) *Attorney, Agent, or Firm* — Smith IP Services, P.C.

(57) ABSTRACT

An apparatus can include a choke with a flow restrictor having at least two positions, a flow coefficient Cv of the choke with the flow restrictor in one position being less than with the flow restrictor in the other position, and an operational device that displaces the flow restrictor at a variable actuation rate, the actuation rate with the flow restrictor in one position being less than with the flow restrictor in the other position. A method can include displacing a flow restrictor, thereby decreasing a flow coefficient Cv of a choke, and decreasing a rate of change of the flow coefficient Cv in response to decreasing the flow coefficient Cv. A drilling system can include a choke with a flow restrictor, and a continuously variable transmission which causes an actuation rate to vary based on a position of the flow restrictor.

21 Claims, 23 Drawing Sheets

(51) Int. Cl.
*E21B 34/16* (2006.01)
*F16K 31/04* (2006.01)
*E21B 21/08* (2006.01)

(58) Field of Classification Search
CPC ...... E21B 21/082; E21B 34/025; E21B 34/16; E21B 34/02; E21B 34/04; E21B 34/045; E21B 21/10–106; F16K 31/047
See application file for complete search history.

(56) References Cited

U.S. PATENT DOCUMENTS

| | | | |
|---|---|---|---|
| 4,565,213 A | 1/1986 | Giebeler | |
| 5,661,232 A | 8/1997 | Van Cleve et al. | |
| 5,861,561 A | 1/1999 | Van Cleve et al. | |
| 2002/0002097 A1* | 1/2002 | Paalasmaa | F16H 3/72 475/5 |
| 2010/0070206 A1 | 3/2010 | Wang et al. | |
| 2012/0067591 A1* | 3/2012 | Couturier | E21B 21/08 166/373 |
| 2014/0005957 A1 | 1/2014 | Pihlaja | |
| 2014/0090888 A1 | 4/2014 | Smith et al. | |
| 2014/0136125 A1 | 5/2014 | Agar et al. | |
| 2016/0084024 A1 | 3/2016 | Dillard et al. | |
| 2016/0138351 A1* | 5/2016 | Dillard | E21B 21/106 175/25 |
| 2016/0194927 A1 | 7/2016 | Dillard et al. | |
| 2016/0281708 A1 | 9/2016 | Kammerstetter et al. | |
| 2016/0341594 A1 | 11/2016 | Singfield | |
| 2017/0274641 A1 | 9/2017 | Pagnon | |
| 2017/0315566 A1* | 11/2017 | Martino | F16K 31/046 |
| 2017/0343457 A1 | 11/2017 | Huber et al. | |
| 2018/0163489 A1* | 6/2018 | Dillard | E21B 44/00 |
| 2018/0245710 A1* | 8/2018 | Taya | F16K 1/20 |
| 2019/0094119 A1 | 3/2019 | Singh et al. | |
| 2020/0393279 A1 | 12/2020 | Reith et al. | |

FOREIGN PATENT DOCUMENTS

| | | |
|---|---|---|
| JP | 06074887 A | 3/1994 |
| WO | 01/55696 A1 | 8/2001 |
| WO | 2013/106843 A1 | 7/2013 |
| WO | 2015/118343 A1 | 8/2015 |

OTHER PUBLICATIONS

International Written Opinion issued Mar. 2, 2018 for PCT Patent Application No. PCT/US2017/064552, 7 pages.
Taha Sochi; "Single Phase Flow of Non-Newtonian Fluids in Porous Media", Journal of Polymer Science: Part B: Polymer Physics, vol. 48, 2437-2767, dated Aug. 12, 2010, 31 pages.
International Search Report with Written Opinion issued Aug. 26, 2022 for PCT Patent Application No. PCT/IB2022/055842, 10 pages.

* cited by examiner

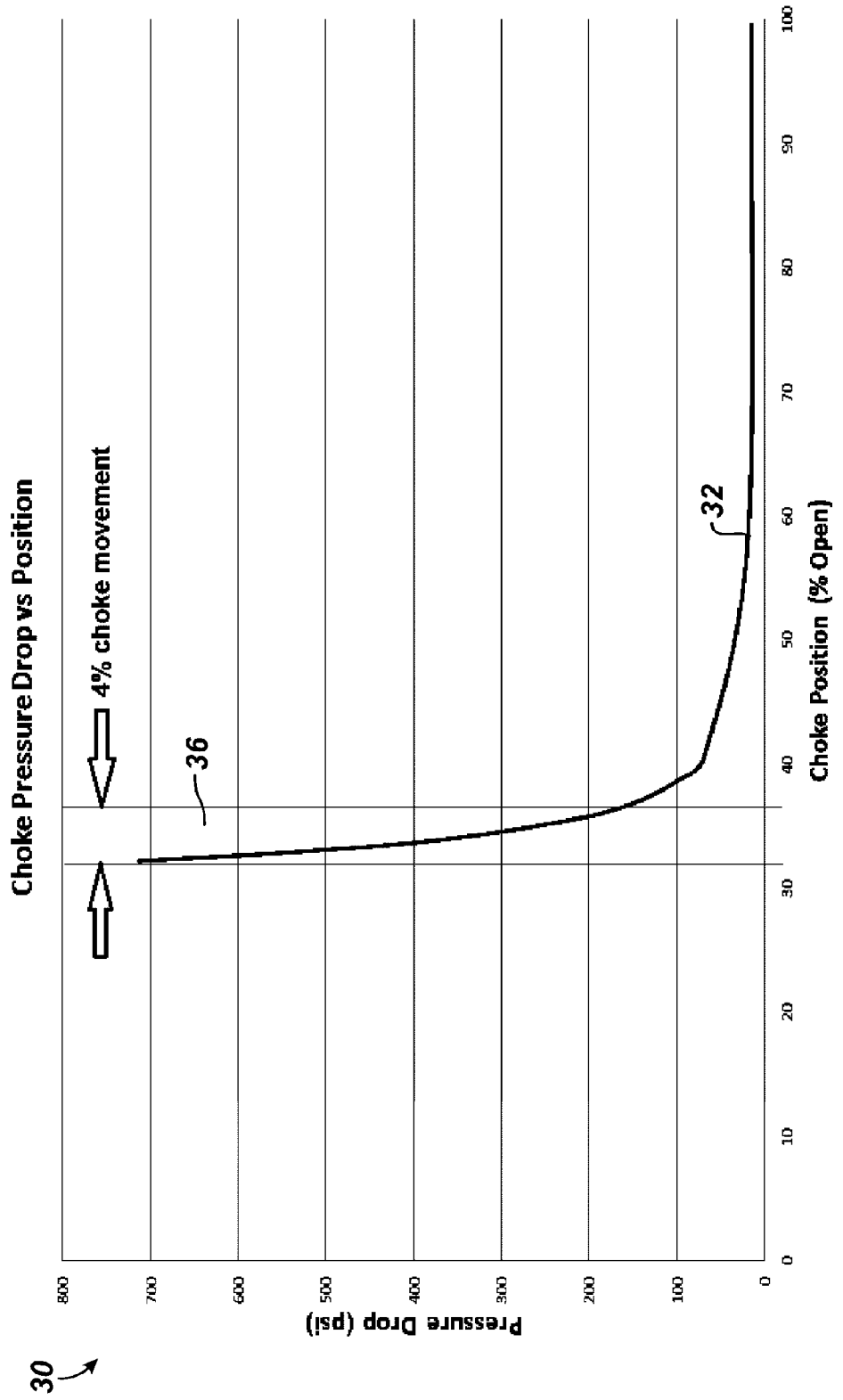

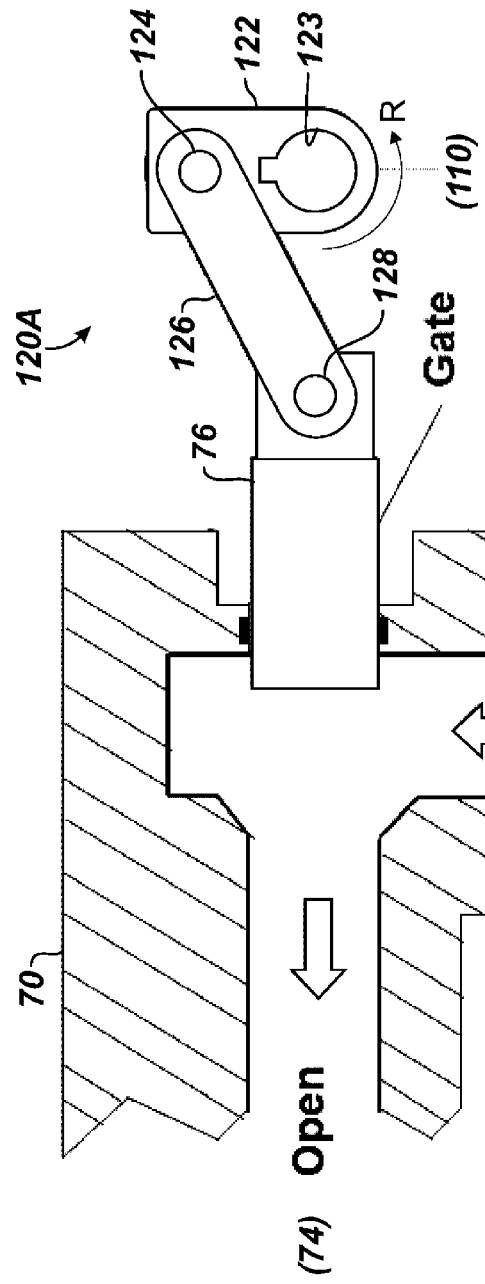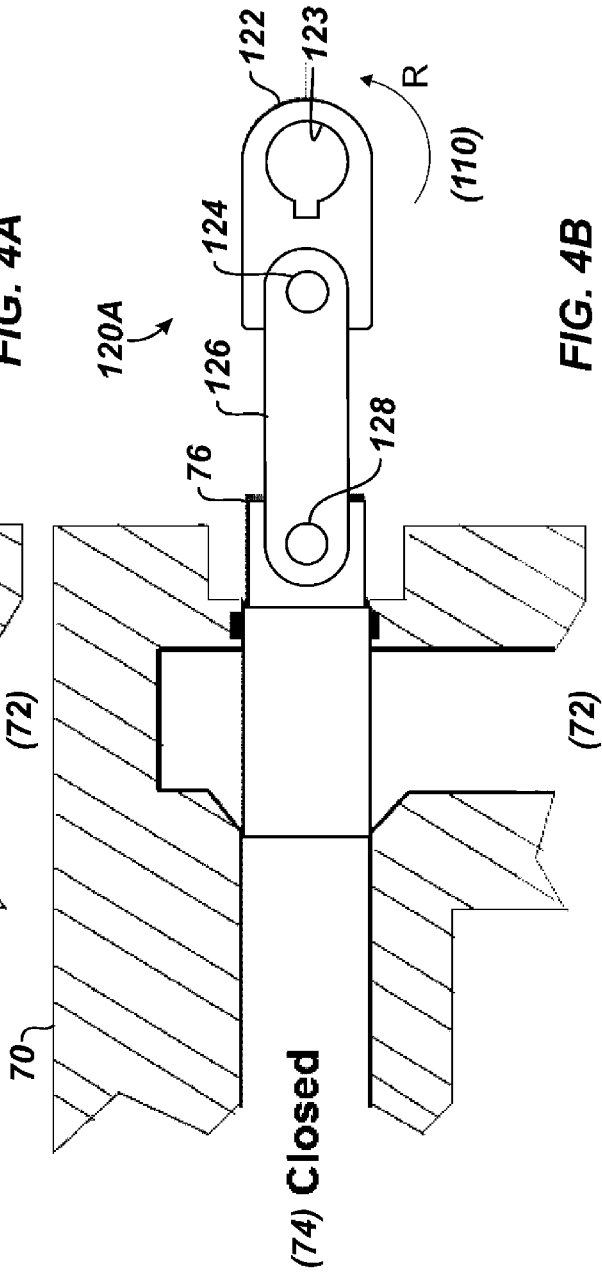

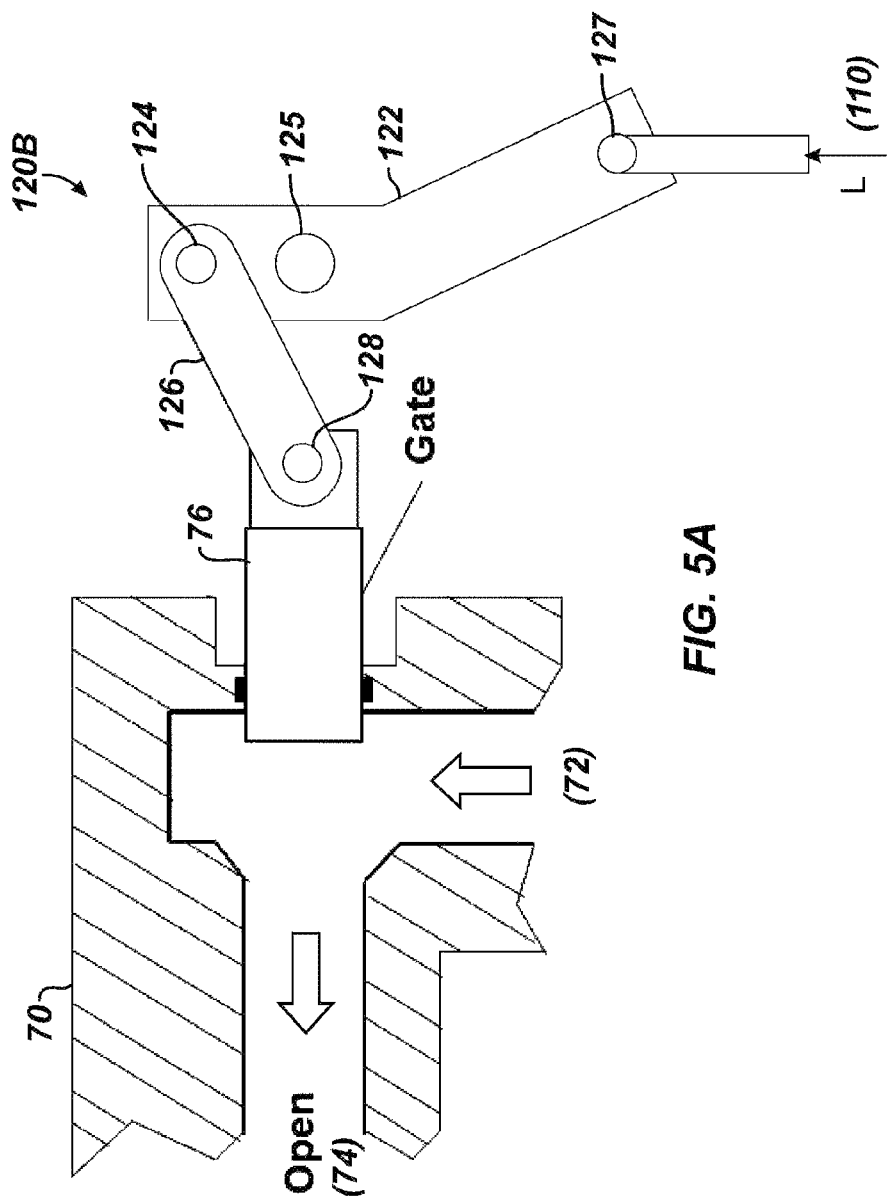

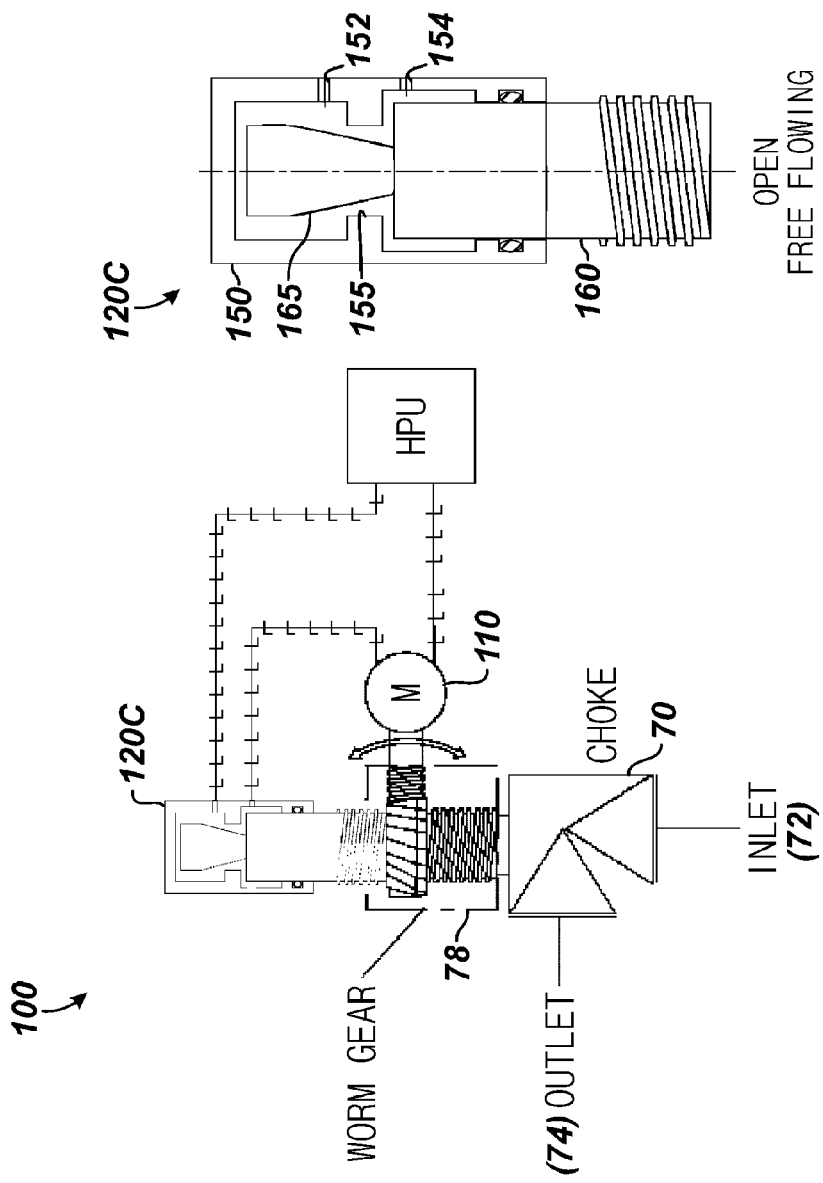

US 11,988,064 B2

MANAGED PRESSURE DRILLING CONTROL SYSTEM WITH CONTINUOUSLY VARIABLE TRANSMISSION

CROSS-REFERENCE TO RELATED APPLICATION

This application is a continuation-in-part of prior U.S. application Ser. No. 15/375,409 filed 12 Dec. 2016. The entire disclosure of the prior application is incorporated herein by this reference.

BACKGROUND

This disclosure relates generally to equipment utilized and operations performed in conjunction with a subterranean well and, in some examples described below, more particularly provides a managed pressure drilling control system utilizing a continuously variable transmission.

A drilling choke is a type of equipment that may be used in well drilling operations. In a well drilling operation known to those skilled in the art as managed pressure drilling, a drilling choke can be used to variably restrict flow of fluids from a well, in order to control fluid pressure in the well. It will, therefore, be readily appreciated that it is important to be able to accurately control operation of the drilling choke, so that as a result the fluid pressure in the well can be accurately controlled.

It is one of the objectives of the present disclosure to provide improvements to the art of controlling operation of a choke, such as a drilling choke. Such improvements can be useful in well operations other than managed pressure drilling (such as, well control, stimulation, water- or steam-flooding, etc.).

BRIEF DESCRIPTION OF THE DRAWINGS

FIG. 1B graphs an example implementation in which particular choke positions (as a percentage open) relate to corresponding pressure drops (psi) produced by a drilling choke.

FIGS. 4A-4B illustrate details of an example of a non-linear transfer mechanism for control between a choke actuator and a gate for a choke according to the present disclosure.

FIGS. 5A-5B illustrate details of a second example of a non-linear transfer mechanism for control between a choke actuator and gate for a choke according to the present disclosure.

FIG. 9 illustrates another embodiment of the choke controlled by a fourth non-linear transfer mechanism according to the present disclosure.

FIGS. 10A-10B shown the fourth non-linear transfer mechanism of FIG. 9 in more detail.

DETAILED DESCRIPTION

In managed pressure drilling (MPD) systems, drilling chokes or other forms of control valves are used to control wellbore pressure and a flow rate of fluids from a wellbore. A mechanism that opens or closes a choke typically consists of either a hydraulic piston that slides axially under control of hydraulic pressure (from a hydraulic power unit) or under control of a worm gear jack screw (driven by a hydraulic or electric motor).

Figure 1A:
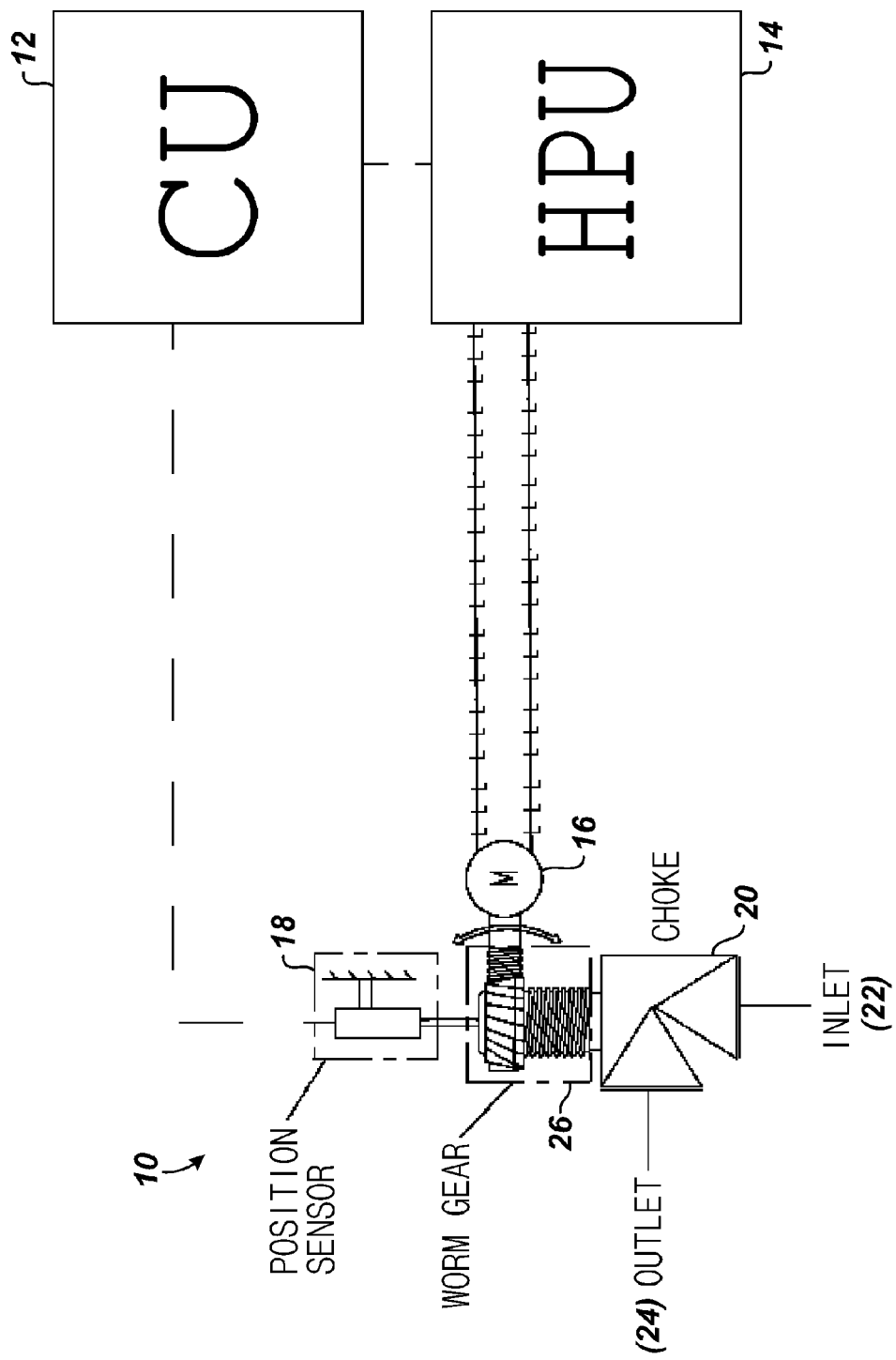
FIG. 1A illustrates a drilling choke, such as used in managed pressure drilling, controlled by a control unit, an actuator, and a position sensor according to the existing art.

For example, FIG. 1A illustrates a drilling choke arrangement 10, such as used in managed pressure drilling. A hydraulic power unit (HPU) 14 feeds hydraulic pressure to a hydraulic motor 16, which turns a jack screw to turn a worm gear 26. An internal trim, such as a gate (not shown), within a drilling choke 20 is moved by the worm gear 26 to change an orifice for fluid flow in the choke 20 from an inlet 22 to an outlet 24. A control unit (CU) 12 couples to the hydraulic pressure unit 14 and to a position sensor 18. To choke the flow from the inlet 22 to the outlet 24, the control unit 12 actuates the HPU 14, motor 16, worm gear 26, etc., to adjust the choke's gate. Feedback from the position sensor 18 is used to monitor the position.

In this arrangement 10, as well as an arrangement that uses a hydraulic piston, the input motion of the actuator 16 that causes the choke 20 to open and close correlates with a direct linear movement of the choke's internal trim (e.g., gate) by design. As a result of the design of the actuator 16, a speed of the moving gate inside of the choke 20 will be the same throughout the time that the input motion is applied. This means that the closing speed of the choke 20 when there is a relatively high pressure drop across the choke 20 will be the same as the closing speed when the choke 20 is near a fully open position.

One obstacle to overcome when controlling pressure is trying to hold a specified wellbore pressure while operating with less than 4% range of available motion of the choke 20 for all required pressure holds during a typical field run. For instance, FIG. 1B graphs a choke pressure drop versus position plot 30 for an example implementation in which particular choke positions (as a percentage open) relate to corresponding pressure drops (psi) produced by a choke. As the graphed line 32 indicates, most of the pressure drop (i.e., about 150-psi to 700-psi) that can be produced with the choke may fall within a range 36 of choke position (e.g., about 32% to 36%) that is essentially 4% of the choke's total possible movement. Accordingly, in this instance, the choke will typically be operated within this 4% of choke movement as the choke is used to manage pressure. As will be evident, precise control of the choke position is required to achieve the desired pressure drop. In fact, a control system can reach a point where each successive increment of 0.1% of the choke gate motion to control the choke can cause a change of 50 psi pressure drop or more as the control system approaches the higher end of the pressure drop range.

When a control system is forced to move a choke at a constant rate along the full range of motion, a special emphasis must be placed on high precision pulses of control system input at the upper range of wellbore pressures. This requires the use of high precision machined components inside the choke or valve actuator as well as the HPU and further tweaking of the control system with periodic calibration to account for the loss of accuracy within the system that occurs over time. Several hundreds of man hours have been spent fine tuning, calibrating, and replacing parts to obtain the final increment of accuracy that is required to pass function testing of systems.

The emphasis of designing MPD control systems up to this point has been focused on precision control within a small range of motion of the choke or valve. A majority of man hours of factory acceptance testing have been spent fine-tuning these control systems and inspecting and replacing mechanical parts in the HPU and choke to achieve the high degree of precision that is required to precisely control the wellbore pressure. For the current designs, the total valid range of pressure control adds up to approximately 4% of the total available gate motion. If the desired accuracy for managed pressure is +/−10 psi in terms of pressure, then the accuracy of the gate motion can be limited to +/−0.02% of the full range which comes to less than +/−0.0005 inches. This accuracy has been achieved with each new system, but it has come at the cost of hundreds of man-hours with each new factory acceptance test. Moreover, each MPD control system typically needs to be re-calibrated frequently to maintain the high level of control precision due to time-related deteriorating factors.

In one example, a method of controlling a drilling choke in a drilling system includes monitoring a parameter in the drilling system and monitoring a position of the drilling choke. An adjustment is determined to the position of the drilling choke based on the monitored parameter and the monitored position. An actuation of an actuator operably coupled to the drilling choke is produced to implement the adjustment. The actuation of the actuator is transferred with a transfer mechanism to motion of the drilling choke in a non-linear relationship relative to the position of the drilling choke. The monitored parameter is altered in response to the implemented adjustment of the drilling choke.

Note that the phrases "adjustment of the drilling choke," "motion of the drilling choke" and "position of the drilling choke" (and similar phrases) indicate an adjustment, motion or position of the drilling choke's internal trim (e.g., a gate or other flow restricting member).

Monitoring the parameter in a controlled pressure system can involve monitoring the parameter including flow-in, flow-out, density, and standpipe pressure, and monitoring the position of the drilling choke can involve obtaining an indication of the position from a position sensor operably connected to the drilling choke. The adjustment to the position of the drilling choke determined based on the monitored parameter and the monitored position can involve correlating a change from the monitored position to a new position of the drilling choke relative to a change from a current value for the monitored parameter to a new value for the monitored parameter. Altering the monitored parameter in response to the implemented adjustment of the drilling choke can include changing surface backpressure of the controlled pressure system.

The actuation of the actuator operably coupled to the drilling choke produced to implement the adjustment can include operating a hydraulic motor with a hydraulic power unit, operating an electric motor with a power supply, etc.

In transferring the actuation of the actuator with the transfer mechanism to the motion of the drilling choke in the non-linear relationship relative to the position of the drilling choke, the motion (e.g., speed) can be made quicker when near the position of being fully opened and can be made slower when near the position of being fully closed. In transferring the actuation of the actuator with the transfer mechanism to the motion of the drilling choke in the non-linear relationship relative to the position of the drilling choke, the motion (e.g., displacement) can be made greater when near the position of being fully opened and can be made smaller when near the position of being fully closed.

Transferring with the transfer mechanism can involve transferring with the transfer mechanism operable between the actuator and the drilling choke. For example, the transfer mechanism can include a linkage operable between the actuator and the drilling choke, a crank and slider linkage operable between the actuator and the drilling choke, or a bell crank linkage operable between the actuator and the drilling choke. The transfer mechanism can be a gear arrangement, such as a planetary or elliptical arrangement, operable between the actuator and the drilling choke, can be a variable ratio chain and sprocket arrangement operable between the actuator and the drilling choke, or can be a variable transmission (such as, a continuously variable transmission) operable between the actuator and the drilling choke.

Transferring with the transfer mechanism can involve transferring with the transfer mechanism operable between a power source and the actuator. For example, the transfer mechanism can include a throttling valve operable between a hydraulic power source and a hydraulic motor of the actuator, a throttling valve operable between a hydraulic source of the power source and a hydraulic motor of the actuator and having a stem directly operated by movement of the choke, a drive operable between an electric power source and an electric motor of the actuator, or a control valve operable between a hydraulic power source and a variable speed hydraulic motor of the actuator. The transfer mechanism can include at least one control algorithm being operable to control the actuator according to the disclosed non-linear relationship.

In one example, a programmable storage device having program instructions stored thereon can cause a programmable control device to control a drilling choke in a drilling system. The teachings of the present disclosure can apply to a drilling choke of a drilling system, as discussed above, and can apply to controlling a choke in other implementations.

In one example, an apparatus for a pressure system includes a valve, a position sensor, an actuator, a controller, and a transfer mechanism. The valve is in operable communication with the pressure system. The position sensor is in operable communication with the valve and obtains a position of the valve trim, and the actuator is in operable communication with the valve. The controller is in operable communication with the position sensor and the actuator. The controller receives an adjustment to the position of the valve trim and produces an actuation of the actuator to implement the received adjustment. The transfer mechanism is operable between the actuator and the valve and transfers the actuation of the actuator to motion of the valve trim in a non-linear relationship relative to the position of the valve trim.

The valve can be a choke, a needle valve, a ball valve, a gate valve, a globe valve, a plug valve, a disc choke with plates, a butterfly valve, or other type of valve or choke. As noted, the valve can be a drilling choke in fluid communication with a borehole. In this arrangement, the controller is operable to monitor a parameter in the pressure system and to monitor the position of the drilling choke. The controller determines the adjustment to the position of the drilling choke based on the monitored parameter and the monitored position and produces the actuation of the actuator operably coupled to the drilling choke to implement the adjustment.

Figure 2A:
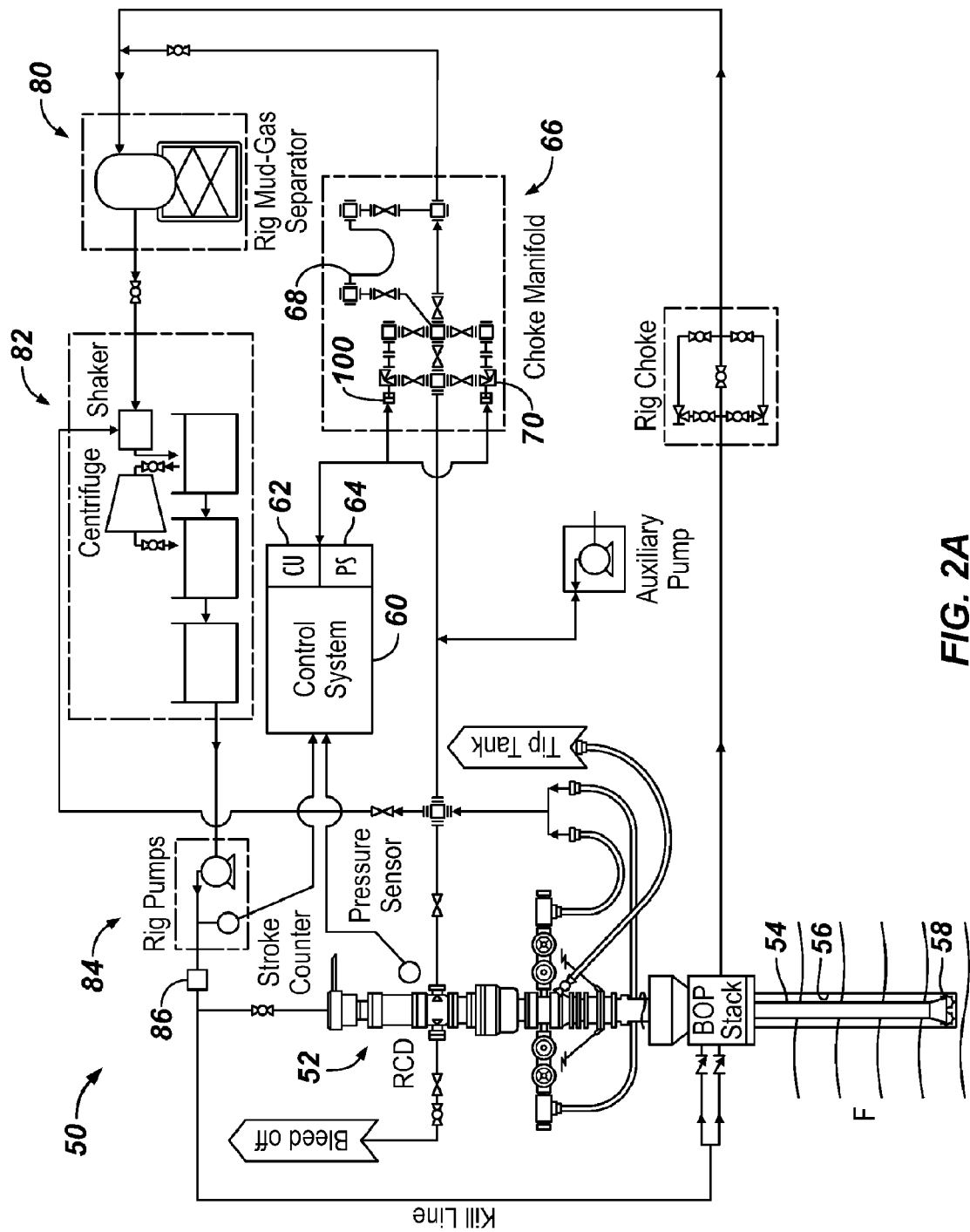
FIG. 2A illustrates an example of a controlled pressure drilling system according to the present disclosure.

FIG. 2A shows an example of a closed-loop drilling system 50 adapted for controlled pressure drilling. As shown and discussed herein, this system 50 can be a Managed Pressure Drilling (MPD) system and, more particularly, a Constant Bottomhole Pressure (CBHP) form of MPD system. Although discussed in this context, the teachings of the present disclosure can apply equally to other types of controlled pressure drilling systems, such as other MPD systems (Pressurized Mud-Cap Drilling, Returns-Flow-Control Drilling, Dual Gradient Drilling, etc.) as well as to Underbalanced Drilling (UBD) systems, and to other types of drilling systems, as will be appreciated by one skilled in the art having the benefit of the present disclosure.

The drilling system 50 has a rotating control device (RCD) 52 from which a drill string 54, a bottom hole assembly (BHA), and a drill bit 58 extend downhole in a wellbore 56 through a formation F. The rotating control device 52 can include any suitable pressure containment device that keeps the wellbore in a closed-loop at all times while the wellbore 56 is being drilled.

The system 50 also includes a standpipe (not shown), rig pumps 84, mud tanks 82, a mud gas separator 80, and various flow lines, as well as other conventional components. In addition to these, the drilling system 50 includes an automated choke manifold 66 that is incorporated into the other components of the system 50, such as a control system 60 having a control unit 62 and a power source 64.

The control system 60 integrates hardware, software, and applications across the drilling system 50 and is used for monitoring, measuring, and controlling parameters in the drilling system 50. In this contained environment of the closed-loop system 50, for example, minute wellbore influxes or losses are detectable at the surface, and the control system 60 can further analyze pressure and flow data to detect kicks, losses, and other events. In turn, at least some operations of the drilling system 50 can be automatically handled by the control system 60. Note that the scope of this disclosure is not limited to use of a valve or choke in a closed-loop drilling system.

To monitor operations, the control system 60 can use data from a number of sensors and devices in the system 50. For example, one or more sensors can measure pressure in the standpipe. One or more sensors (i.e., stroke counters) can measure the speed of the rig pumps 84 for deriving the flow rate of drilling fluid into the drill string 54. In this way, flow into the drill string 54 may be determined from strokes-per-minute and/or standpipe pressure. Alternatively, a flowmeter 86, such as a Coriolis flowmeter downstream of the rig pumps 84, can also be used to measure flow-in to the wellbore 56.

One or more sensors can measure the volume of fluid in the mud tanks 82 and can measure the rate of flow into and out of mud tanks 82. In turn, because a change in mud tank level can indicate a change in drilling fluid volume, flow-out of the wellbore 56 may be determined from the volume entering the mud tanks 82.

The fluid data and other measurements noted herein can be transmitted to the control system 60, which can in turn operate drilling functions. In particular, the control system 60 can use the control unit 62 and power source 64 to operate the automated choke manifold 66, which manages pressure and flow during drilling and is incorporated into the drilling system 50 downstream from the rotating control device 52 and upstream of the gas separator 80. Among other components, the manifold 66 has chokes 70, a flowmeter 68, pressure sensors (not shown), and other components. The controller or control unit 62 control operation of the manifold 66, and the power source 64 (e.g., hydraulic power unit and/or electric motor) actuate the chokes 70.

During operations, the system 50 uses the rotating control device 52 to keep the well closed to atmospheric conditions. Fluid leaving the wellbore 56 flows through the automated choke manifold 66, which measures return flow (e.g., flow-out) and density using a flowmeter 68 installed in line with the chokes 70. Software components of the control system 60 then compare the flow rate in and out of the wellbore 56, the injection pressure (or standpipe pressure), the surface backpressure (measured upstream from the drilling chokes 70), the position of the chokes 70, and the mud density, among other possible variables. Comparing these variables, the control system 60 then identifies minute downhole influxes and losses on a real-time basis to manage the annulus pressure during drilling.

By identifying the downhole influxes and losses during drilling, for example, the control system 60 monitors circulation to maintain balanced flow for constant BHP under operating conditions and to detect kicks and lost circulation events that jeopardize that balance. The drilling fluid is continuously circulated through the system 50, choke manifold 66, and the Coriolis flowmeter 68. As will be appreciated, the chokes 70 may fluctuate during normal operations due to noise, sensor errors, etc., so that the system 60 can be calibrated to accommodate such fluctuations. In any event, the system 60 measures the flow-in and flow-out of the well, detects variations, and operates the chokes 70 to account for the variations. In general, if the flow-out is higher than the flow-in, then fluid is being gained in the system 50, indicating a kick. By contrast, if the flow-out is lower than the flow-in, then drilling fluid is being lost to the formation, indicating lost circulation.

To then control pressure, the control system 60 introduces pressure and flow changes to the incompressible circuit of fluid at the surface to change the annular pressure profile in the wellbore 56. To do this, the control system 60 uses the chokes 70 in the choke manifold 66 to apply surface backpressure within the closed loop, which can produce a reciprocal change in bottomhole pressure. In this way, the control system 60 uses real-time flow and pressure data and manipulates the annular backpressure to manage wellbore influxes and losses.

In the control process, the control system 60 uses internal algorithms to identify what event is occurring downhole, and reacts automatically. For example, the control system 60 monitors for any deviations in values during drilling operations, and alerts the operators of any problems that might be caused by a fluid influx into the wellbore 56 from the formation F or a loss of drilling mud into the formation F. In addition, the control system 60 can automatically detect, control, and circulate out such influxes and losses by operating the chokes 70 of the choke manifold 66 and performing other automated operations.

Figure 2B:
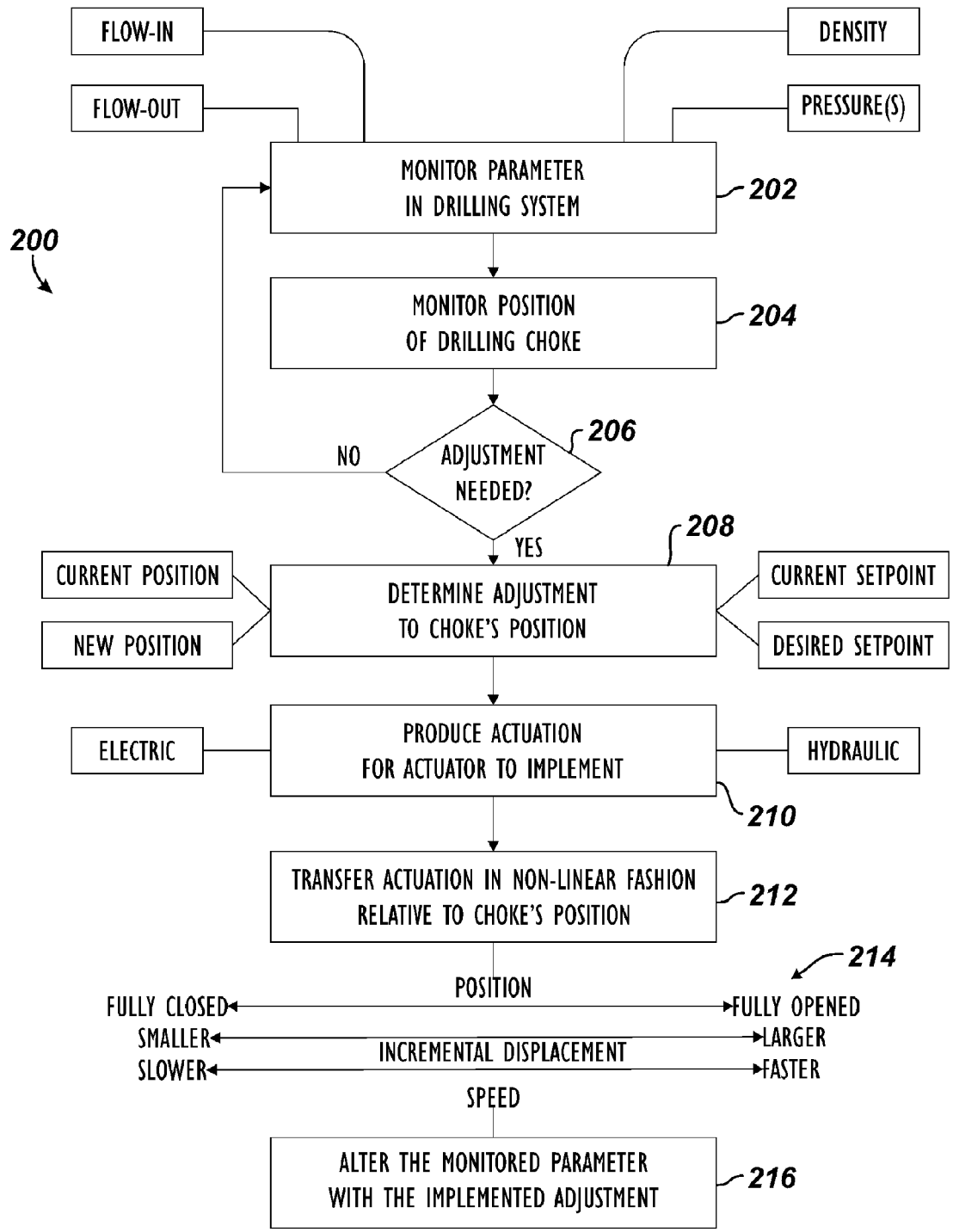
FIG. 2B illustrates an example of a process for controlled pressure drilling according to the present disclosure.

FIG. 2B illustrates an example of a process 200 for controlled pressure drilling. The control system (60) monitors various parameters of the drilling system (50), such as flow-in, flow-out, density, standpipe pressure, temperature, etc. (Block 202). The control system (60) also monitors position of the drilling choke(s) (70) (Block 204). The position information can be obtained from position sensor(s) operably connected to the drilling choke.

As drilling is performed, differences in the monitored parameters may indicate that operational changes are necessary, such as increasing or decreasing surface backpressure using the drilling choke(s) (70), so that decisions are continually made based on the monitored parameters (Decision 206). If adjustment to the choke(s) (70) is necessary, the control system (60) determines what adjustment to the position of the drilling choke is needed based on the monitored parameters and the monitored position (Block 208). As briefly described here, the control system (60) considers the current position of the choke(s), the current set point and correlates a change from the current position to a new position of the choke(s) relative to a desired change from a current set point of a monitored parameter to a new set point for the monitored parameter.

With the adjustment determined, the control system (60) produces actuation(s) of actuator(s) operably coupled to the drilling choke(s) (70) to implement the adjustment (Block 210). Depending on the actuator(s) used and the power source, the actuation(s) can be electrical, hydraulic, etc.

In the implementation of the actuation(s), the transfer mechanism (120, see FIG. 3) transfers the actuation(s) of the actuator(s) to motion of the drilling choke(s) (70) in a non-linear relationship relative to the position of the drilling chokes (70) (Block 212). As generally depicted here (Item 214), the non-linear relationship may tend to make the motion (i.e., speed) of the choke(s) (70) slower when near the position of being fully closed, whereas the motion (i.e., speed) of the choke(s) (70) may be quicker or faster by comparison when near the position of being fully opened. Likewise, the non-linear relationship may tend to make the motion (i.e., displacement) of the choke(s) (70) smaller when near the position of being fully closed, whereas the motion (i.e., displacement) of the choke(s) (70) may be larger by comparison when near the position of being fully opened. As noted, the additional control of the motion of the choke when near a more closed position is of particular interest with respect to controlling the flow, pressure, etc., through or in the choke.

In the end, the monitored parameter of the drilling system (50) can be properly altered in response to the implemented adjustment(s) of the drilling choke(s) (Block 216). For example, increased surface backpressure can be applied to produce an increase in bottomhole pressure and counter a fluid influx from the formation.

Figure 3:
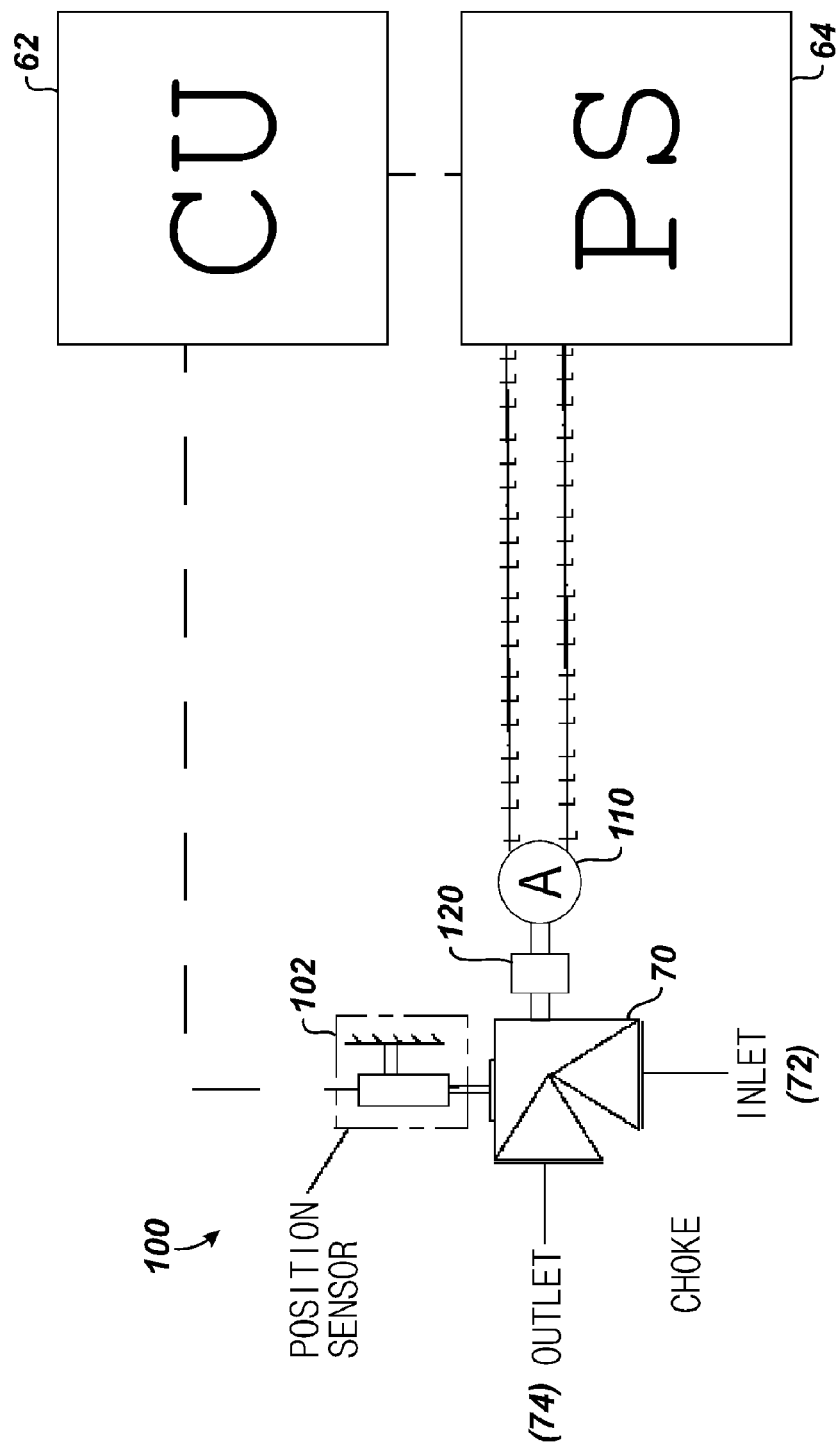
FIG. 3 illustrates an embodiment of a choke, such as used in controlled pressure drilling, controlled by a control unit, a power source, and an operational device according to the present disclosure.

FIG. 3 illustrates an embodiment of a choke 70, such as a drilling choke used in managed pressure drilling, controlled by a control unit 62 and a power source 64. An operational device 100 for operating the choke 70 includes a position sensor 102, an actuator 110, and a non-linear transfer mechanism 120 according to the present disclosure. An internal trim, such as a gate (not shown) within the choke 70, is moved to change an orifice for fluid flow in the choke 70 from the inlet 72 to the outlet 74.

The position sensor 102 is in operable communication with the control unit 62 to provide position information of the choke 70, such as the position of the choke's internal gate or other internal trim mechanism (not shown). In general, the choke 70 can be a plug-style choke with trim that includes a gate and seat, such as used in a choke manifold of a drilling system. Other types of chokes could benefit from the teachings of the present disclosure, so that reference to the term "choke" as used herein can apply also to various types of valves capable of variably restricting fluid flow, such as needle valve, ball valve, gate valve, globe valve, plug valve, disc choke with plates and alignable orifices, butterfly valve, etc.

The actuator 110 is in operable communication with the power source 64, which is operated by the control unit 62. Based on system controls and determinations, the control unit 62 receives and/or determines an adjustment for the position of the choke 70 and produces an actuation of the actuator 110 to implement the adjustment. As noted, the purpose of the adjustment can be to control surface backpressure in a managed pressure drilling system. However, the scope of this disclosure is not limited to any particular purpose for adjusting a position of a choke or valve.

The non-linear transfer mechanism 120 is operable between the actuator 110 and the drilling choke 70. Instead of allowing the actuation and adjustment to be applied directly to the choke 70, the transfer mechanism 120 intermediates the transfer of the actuation from the actuator 110 to motion of the drilling choke 70 in a non-linear relationship relative to the position of the trim inside the drilling choke 70. The input from the transfer mechanism 120 is thereby applied to the choke 70 to produce motion of a variable orifice in the choke 70. (As noted, the internal trim in the choke 70 can be a gate, although other forms of trim can be used, such as ball, flapper, disc, etc.) In turn, the position sensor 102 detects the position information and feeds back to the control unit 62.

In this and other configurations disclosed herein, the position sensor 102 is preferably coupled directly to the gate or flow restrictor 76 in the choke 70 to allow an accurate reading of the position for control purposes. In other examples, the position sensor 102 could detect a position of a member of the actuator 110 or the transfer mechanism 120. The position sensor 102 can include a linear potentiometer, a Linear Variable Differential Transformer (LVDT), a proximity sensor, or any suitable device to detect position. Of course, other arrangements and different position sensors are possible.

The non-linear transfer mechanism 120 forces the non-linear relationship between the actuation and the resulting valve motion such that the valve motion occurs more quickly when near a fully opened position and occurs more slowly when near a fully closed position. As a result of the changed correlation, a broader range of controlled motion can be effectively used to control the wellbore pressure, thereby decreasing the necessary positional accuracy of the actuator 110 (e.g., hydraulic or electric motor) coupled with the control unit 62 and power source 64.

For example, the actuator 110 may be a hydraulic motor or an electric motor providing revolutions to actuate the choke 70. The non-linear transfer mechanism 120 can allow for five (5) revolutions of the motor 110 to control the applicable range of wellbore pressure instead of using just one (1) revolution. Consequently, the precision requirement for the actuator position can be relaxed by up to five (5) times.

Various types of non-linear transfer mechanisms 120 as disclosed herein can be used. In a first type, the transfer mechanism 120 can use an assembly of mechanical parts that force a nonlinear relationship between the input motion from the actuator 110 (e.g., rotational or linear motor or hydraulic cylinder) and the motion of the internal trim flow restrictor in the choke 70.

FIGS. 4A-4B illustrate a first non-linear transfer mechanism 120A of the present disclosure that uses a mechanical assembly. The mechanism 120A includes a crank and slider assembly having a rotating arm 122 with a hinged push rod 126 attached to a gate or flow restrictor 76 of a choke 70 (shown simplified). The rotating arm 122 is coupled at an input point 123 to rotational input R from the actuator 110, which can be a hydraulic or electric motor, for example. Rotation of the rotating arm 122 about the input 123 transfers to the hinged push rod 126 via a moving pivot 124. The rod 126 couples with another moving pivot 128 to the gate 76 so that the rod 126 changes the rotary motion of the arm 122 into reciprocating motion of the gate 76 of the choke 70.

In this embodiment, the overall closing time of the choke 70 may remain the same as with a conventional design. However, with the choke 70 near an opened position (FIG. 4A), each increment of rotation of the arm 122 results in greater motion of the gate 76. By contrast, with the choke 70 near a closed position (FIG. 4B), each additional increment of rotation of the arm 122 results in less motion of the gate 76. Thus, the rotational input R of the actuator 110 is transferred by the mechanism 120A in a non-linear fashion to the motion of the gate 76, which gives more control to the operation of the choke 70.

Figure 5B:
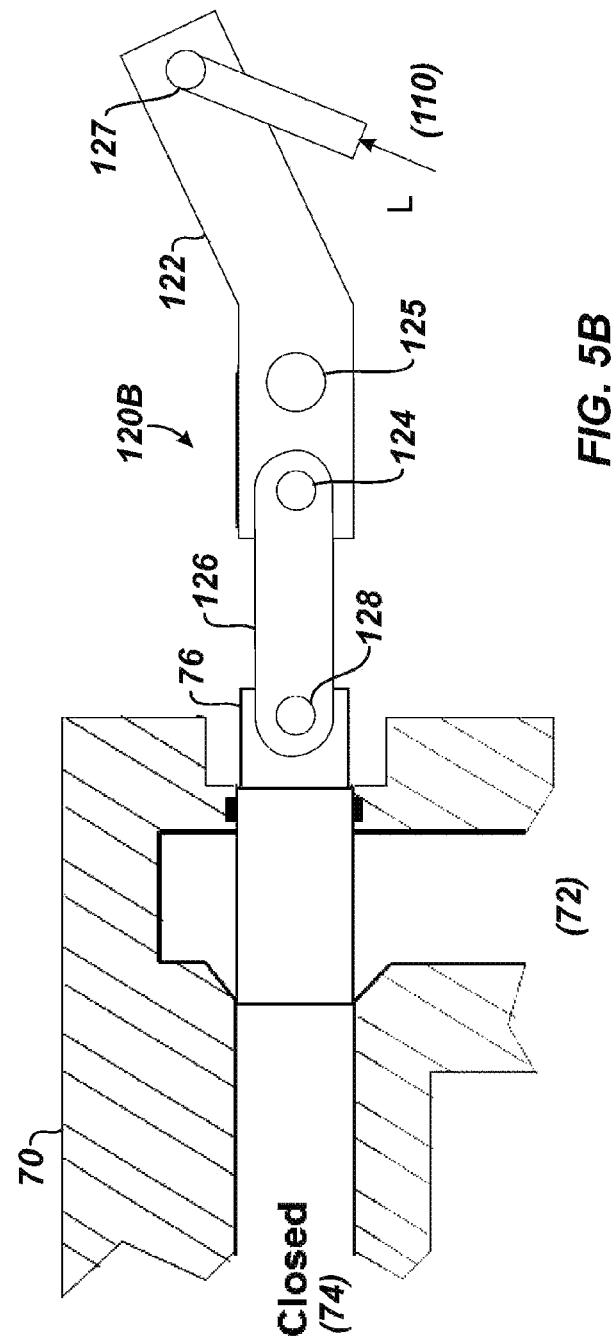

FIGS. 5A-5B illustrate a second non-linear transfer mechanism 120B of the present disclosure that also uses a mechanical assembly. Here, the mechanism 120B includes a bell-crank linkage having a rotating arm 122 with a hinged push rod 126 attached to the gate 76 of the choke 70 (shown simplified). The rotating arm 122 is coupled at a pivot 127 to a linear input L from the actuator 110, which can be a piston or linear motor, for example. Rotation of the rotating arm 122 about a fixed pivot 125 transfers to the hinged push rod 126 via a moving pivot 124. The rod 126 couples with another moving pivot 128 to the gate 76. The linear input L from the actuator 110 rotates the arm 122, and the rod 126 changes the rotary motion of the arm 122 into reciprocating motion of the gate 76 of the choke 70.

In this embodiment, the overall closing time of the choke 70 may remain the same as with a conventional design. However, with the choke 70 near an opened position (FIG. 5A), each increment of rotation of the arm 122 results in greater motion of the gate 76. By contrast, with the choke 70 near a closed position (FIG. 5B), each additional increment of rotation of the arm 122 results in less motion of the gate 76. Thus, the linear input L of the actuator 110 is transferred by the mechanism 120B in a non-linear fashion to the motion of the gate 76, which gives more control to the operation of the choke 70.

In the mechanical assemblies of FIGS. 4A-5B, the mechanisms 120A-B have a fixed transfer relationship due to the mechanics of the components, and the particulars of the fixed mechanics involved can be configured for a given implementation. In this way, a given mechanism 120A-B with one of a plurality of different mechanics can be used on a given choke 70 to suit the requirements of an implementation. Differences in the geometry and sizes of the arms 122, 126 for example can achieve different control. Additionally, the pivot points 124, 128 can be adjustable on the arms 122, 126 to alter the mechanics, and/or arms 122, 126 of different lengths and geometries may be used interchangeably to alter the mechanics.

Figure 6A:
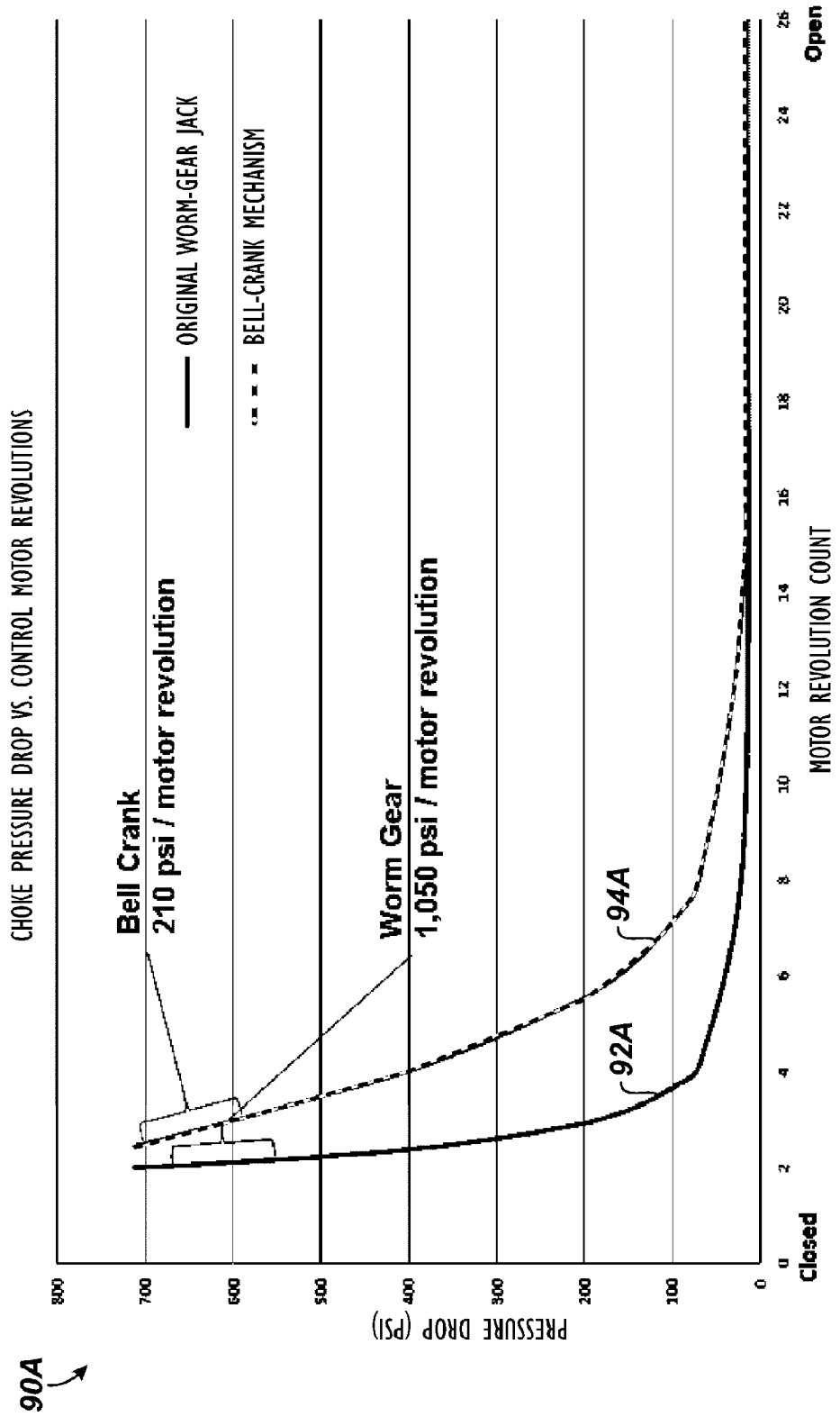
FIG. 6A graphs comparative curves for examples of a bell crank mechanism and a worm gear mechanism as a function of choke pressure drop relative to control motor revolutions.

For comparative purposes, FIG. 6A graphs a plot 90A of a choke's pressure drop (psi) versus control motion revolution (count) for an existing worm gear mechanism (e.g., 26: FIG. 1A) alone and for an operational device (100) having a transfer mechanism (e.g., 120A-B: FIGS. 4A to 5B) of the present disclosure. The plot 90A shows the change of slope for two pressure curves 92A, 94A as they relate to a number of motor revolutions. The first pressure curve 92A is shown for the existing worm gear mechanism (26) of the prior art, such as shown in FIG. 1A and as is currently used in a choke actuator. This first pressure curve 92A is compared to a second pressure curve 94A for an operational device having the crank-slider or bell crank mechanisms (120A-B) of the present disclosure. (This example of the mechanism (120A-B) uses a 100:1 reducer gearbox installed between the motor (110) and the mechanism (120A-B) to reduce 26 revolutions of the motor (110) into a ¼ of a revolution of the rotating arm (122).) As the slope of the second curve 94A indicates, the mechanism 120A-B may provide approximately five (5) times more control resolution than the direct-drive worm gear mechanism (26) alone.

Figure 6B:
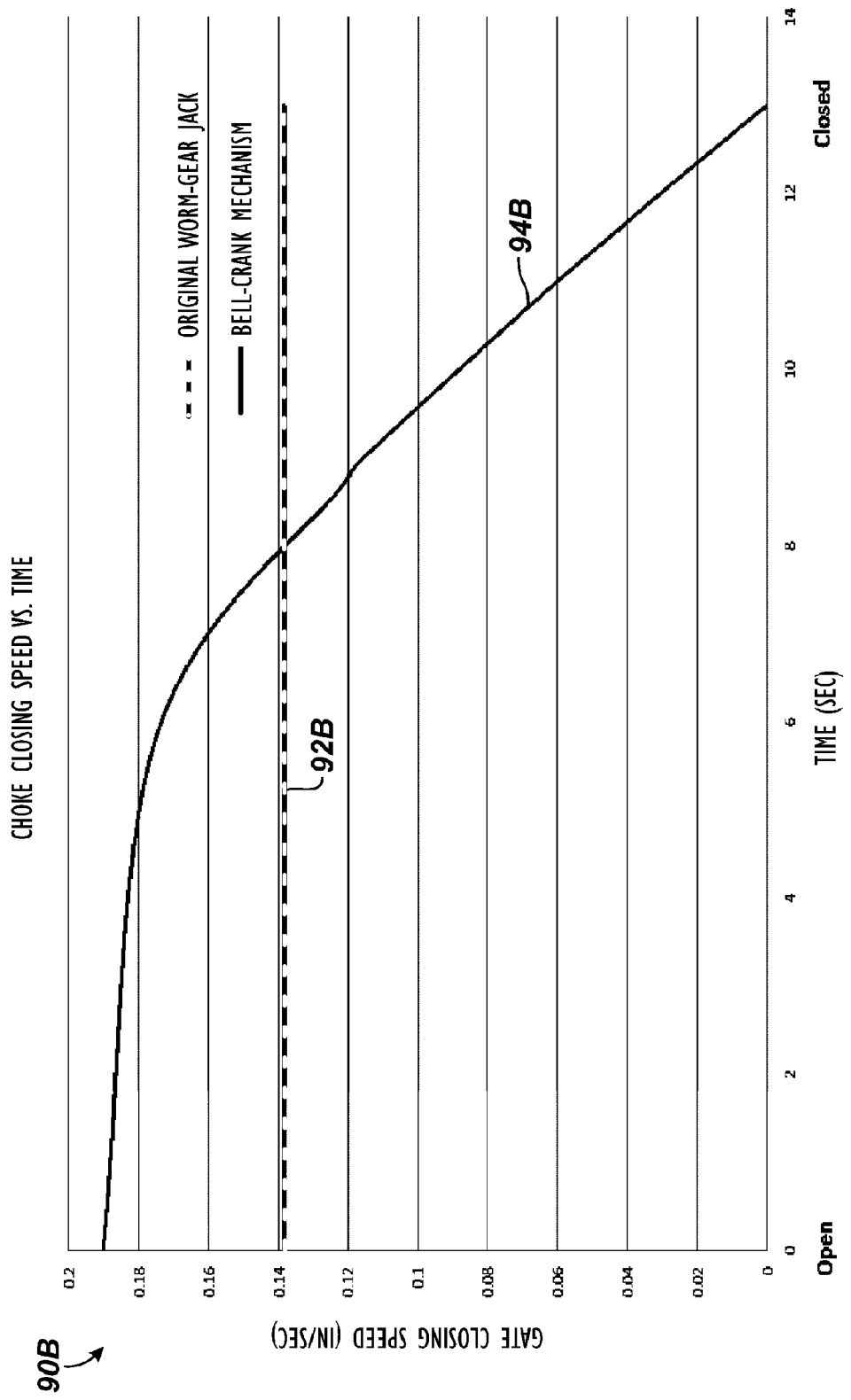
FIG. 6B graphs comparative curves for the bell crank mechanism and the worm gear mechanism as a function of choke closing speed relative to time.

For comparative purposes, FIG. 6B graphs another plot 90B of choke closing speed (in/sec) versus time (sec) generally depicting the non-linear relationship. The plot 90B shows how the closing speed of the gate (76) does not vary with time for the existing worm screw mechanism (26: FIG. 1A) in curve 92B and shows how the closing speed of the gate (76) does vary with time for the disclosed crank-slider or bell crank mechanisms (120A-B) in curve 94B. The gate (76) closing speed (in/sec) is graphed relative to the choke closing position in time (sec) from opened to closed. As shown by curve 92B, the existing worm-gear mechanism (26) has a practically constant (linear) closing speed, which in this example is about 0.14-in/sec, as the gate (76) goes from an opened position to a closed position over a time period of 0 to about 13-sec. By contrast, the disclosed transfer mechanism (120A-B) shown by curve 94B has a varied closing speed that drops off over time, as the gate (76) goes from an open state to a closed state. The mechanism (120A-B) tend to make the motion (La, speed) of the choke (70) quicker or faster when near the position of being fully opened, whereas the motion (i.e., speed) of the choke (70) may be slower when near the position of being fully closed. This indicates that more refined closing can be achieved with the disclosed mechanisms (120A-B).

Figure 6C:
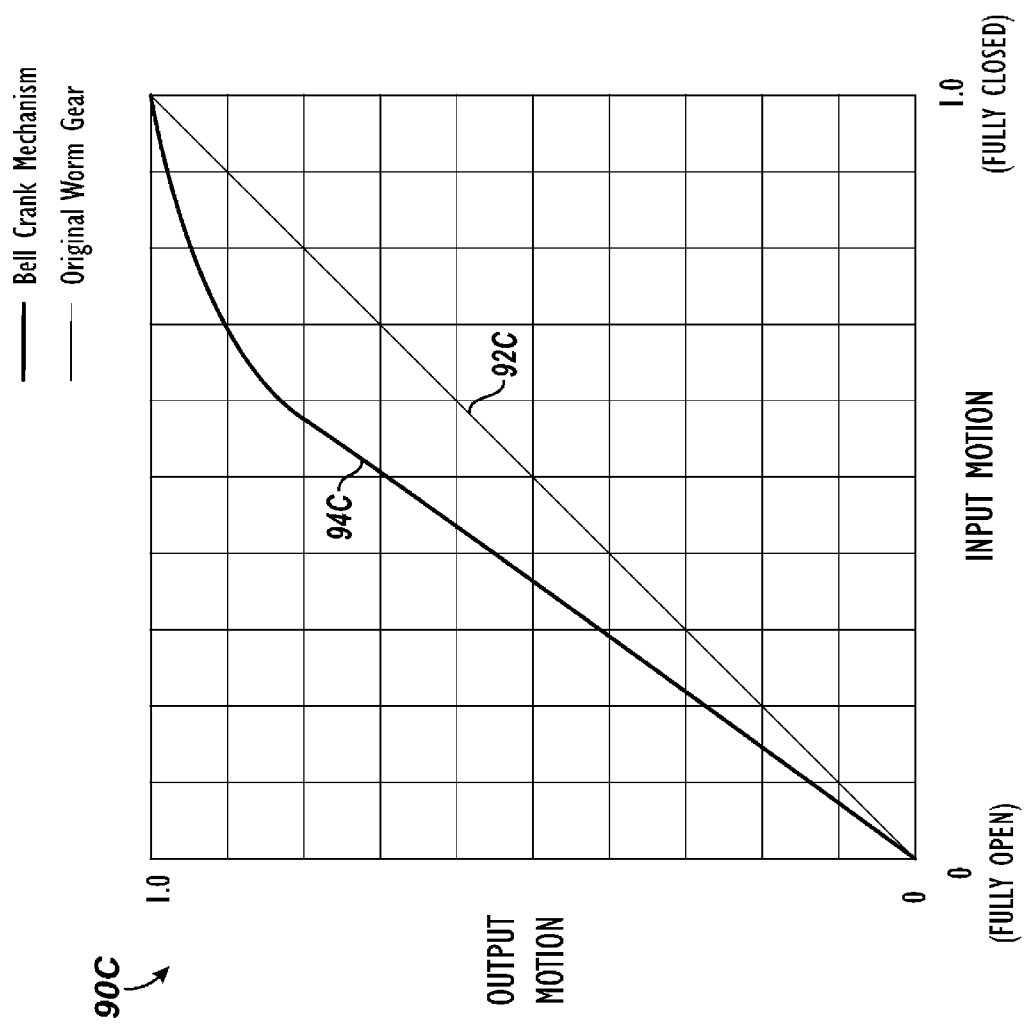
FIG. 6C graphs comparative curves for the disclosed transfer mechanism and the worm gear mechanism as a function of input motion relative to output motion.

Looking at the relationship another way in a plot 90C of FIG. 6C, the non-linear relationship of the transfer mechanism (120A-B) can be viewed as actuation input from an actuator (i.e., input motion, degrees rotation of motor, linear displacement of piston, etc.) graphed relative to output of the choke (i.e., output motion, displacement of the choke's trim, etc.). For the worm gear arrangement, the transfer line 92C is constant in that each actuation input (degree rotation of the motor) results in output of the choke in a linear fashion as shown by the straight line. The correlation between the input and the output is linear, indicating that every increment (degree) of displacement of the actuator input produces a corresponding increment of displacement of the choke output.

By contrast, the transfer mechanism (120A-B) provides a different correlation between the input and output. As shown, the transfer line 94C initially has a steeper slope near the open state (0), which indicates that a given displacement of the input produces a greater displacement of the output. Yet, near the closed state (1), the slope of the transfer line 94C is less than the 1:1 ratio of the standard transfer line 92C. This lower slope indicates that a given displacement of the input results in a smaller displacement of the output. Accordingly, the non-linear relationship may tend to make the motion (i.e., displacement) of the choke(s) (70) smaller when near the position of being fully closed (1), whereas the motion (i.e., displacement) of the choke (70) may be larger by comparison when near the position of being fully opened (0).

Figure 7A:
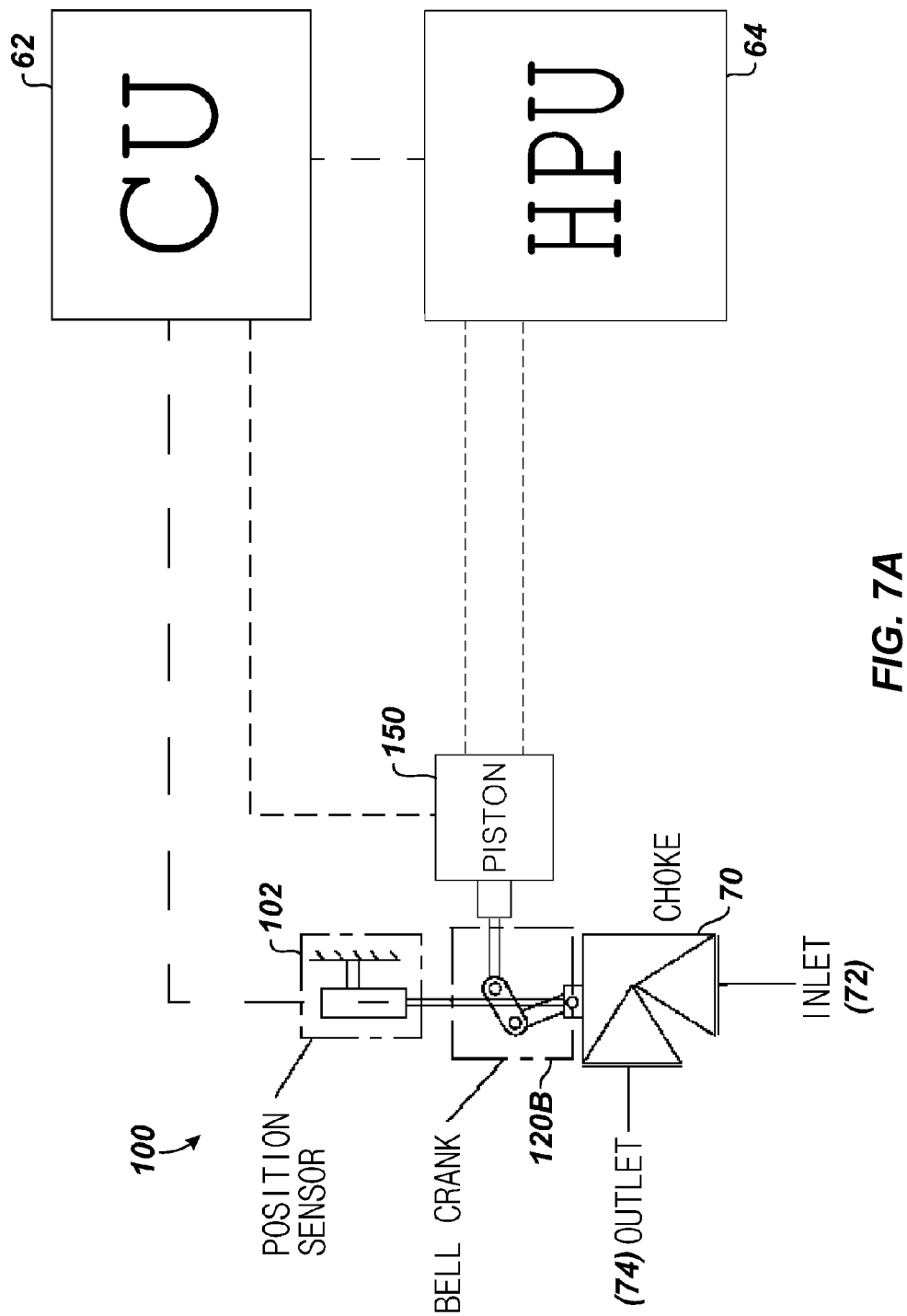
FIG. 7A illustrates an example of an operational device according to the present disclosure having a bell crank and a piston for control of a drilling choke.
Figure 7B:
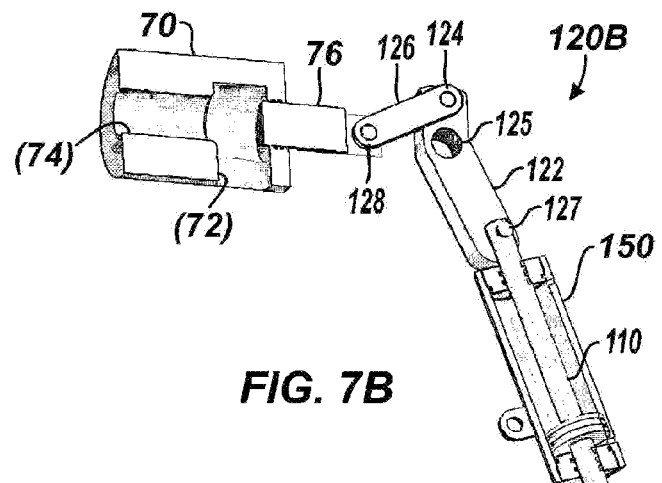
FIGS. 7B-7D illustrate details of the example bell crank and piston arrangement for control of a gate on a choke according to the present disclosure.
Figure 7C:
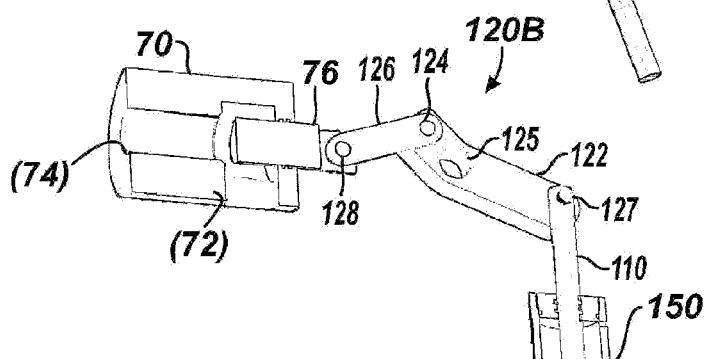
Figure 7D:
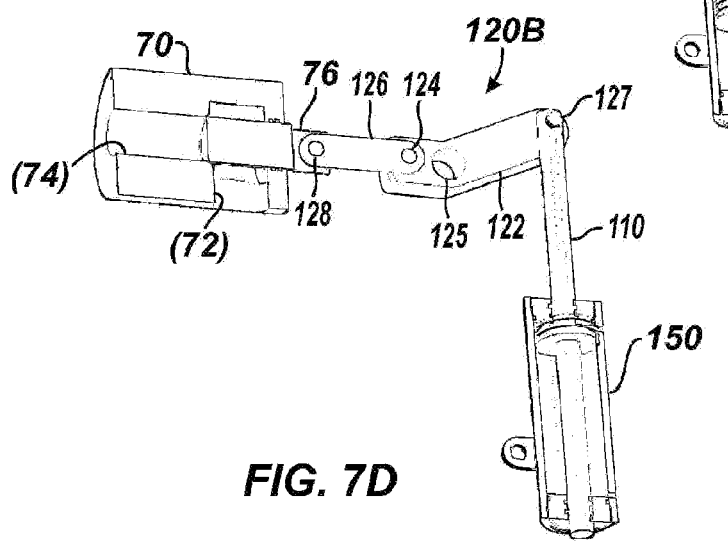

Another example of the operational device 100 depicted in FIG. 7A combines the mechanical mechanism 120B shown in FIGS. 5A-5B with a hydraulic cylinder 150 as the actuator. A piston of the cylinder 150 attaches to the back side of the rotating arm 122. FIGS. 7B-7D show the bell crank mechanism 120B in conjunction with the cylinder 150 during stages of operation. The orientation and arrangement of the hydraulic cylinder 150 with respect to the rotating mechanism 120B is such that the initial driving motion from the sliding piston yields a relatively larger rotating motion than the final driving motion. The resulting variable rotating speed combined with the mechanical advantage of the rotating mechanism 120B provides additional resolution to the control as the gate (76) approaches the closed position.

Figure 8:
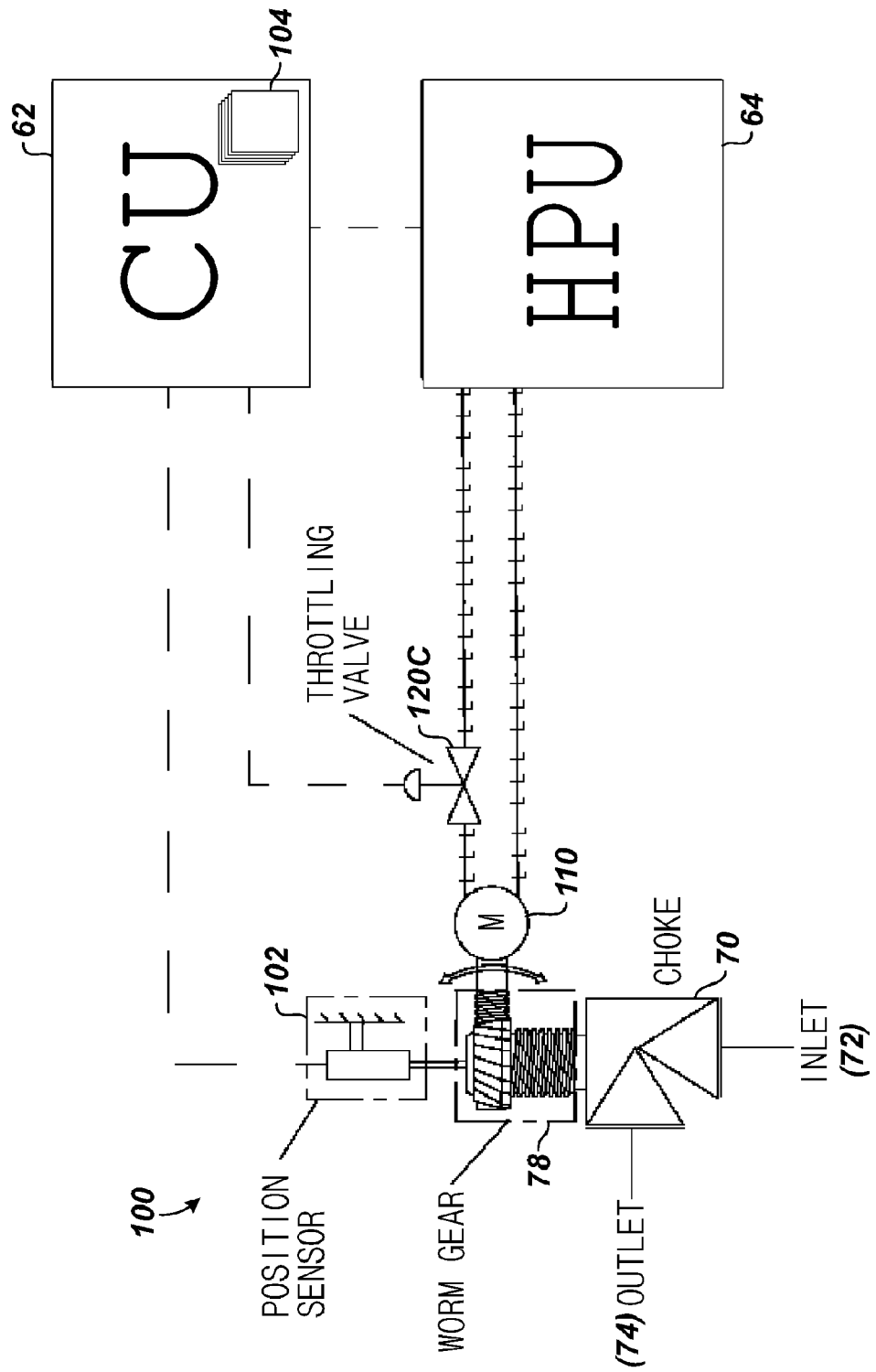
FIG. 8 illustrates an embodiment of a choke controlled by a control unit, an actuator, a position sensor, and a third non-linear transfer mechanism according to the present disclosure.

FIG. 8 illustrates a choke 70 controlled by a control unit 62 and a power source 64 and operated by another operational device 100 according to the present disclosure. As shown, the operational device 100 for operating the choke 70 includes a position sensor 102, an actuator 110, and a non-linear transfer mechanism 120C. Here, the actuator 110 is a hydraulic motor powered by hydraulics from a hydraulic power unit (HPU) also referred to as the power source 64 in this example. The actuator 110 couples to the choke 70 with a worm gear arrangement 78 or or other suitable mechanism, which transfers the rotation of the motor 110 into reciprocal movement of the internal trim or flow restrictor (not shown) in the choke 70.

The non-linear transfer mechanism 120C includes a hydraulic throttling valve coupled to the hydraulics between the hydraulic motor 110 and the hydraulic power unit 64. The control unit 62 uses one or more control algorithms 104 that send control signals to the hydraulic throttling valve 120C coupled with the hydraulic motor 110. (If more than one control algorithm 104 is available, selection of a particular control algorithm 104 can be performed by the control unit 62 based on calibration, operating parameters, etc.) The controlled throttling from the signals causes the hydraulic motor 110 to speed up and slow down the motor revolutions according to feedback coming from the position sensor 102. Accordingly, these signals for controlling the speed of motor revolutions are used to achieve the purposes disclosed herein—namely slowing the closing speed of the internal trim (e.g., gate 76 or flow restrictor) in the choke 70 when near a fully closed position.

FIG. 9 illustrates a related configuration where a non-linear transfer mechanism 120C includes a hydraulic throttling valve coupled between the hydraulic motor 110 and the hydraulic power unit 64. Here, an operation stem of throttling valve 120C is physically moved by (directly operated by, attached to, or connected to) the stem on the choke 70, alongside the position sensor (not shown). The throttling valve 120C thereby moves with the movement of the choke 70 and correspondingly throttles the hydraulics to the motor 110.

FIGS. 10A-10B shows the hydraulic throttling valve 120C in more detail in two operating conditions (open—FIG. 10A and closed—FIG. 10B). The operation stem 160 of the valve 120C is physically moved by (or attached to) the choke stem (not shown) so the operation stem 160 can reciprocate inside a throttle housing 150. A throttling head 165 of the stem 160 can move relative to a flow restriction or orifice 155 to throttle flow from an inlet 152 (coupled to the power unit 64) to an outlet 154 (coupled to the motor 110).

In FIG. 10A, the throttling valve 120C is open with the throttling head 165 moved away from the flow restriction 155 for free flow of the hydraulics from the inlet 152 to the outlet 154. As the choke (70) moves closer to closing, however, the throttling valve's head 165 also moves closer to closing in the flow restriction 155, which slows down the flow of hydraulic fluid from the HPU 64 at the inlet 152 to the motor 110 at the outlet 154. This in turn slows down the closing speed of the gate (76) of the choke (70).

Figure 11:
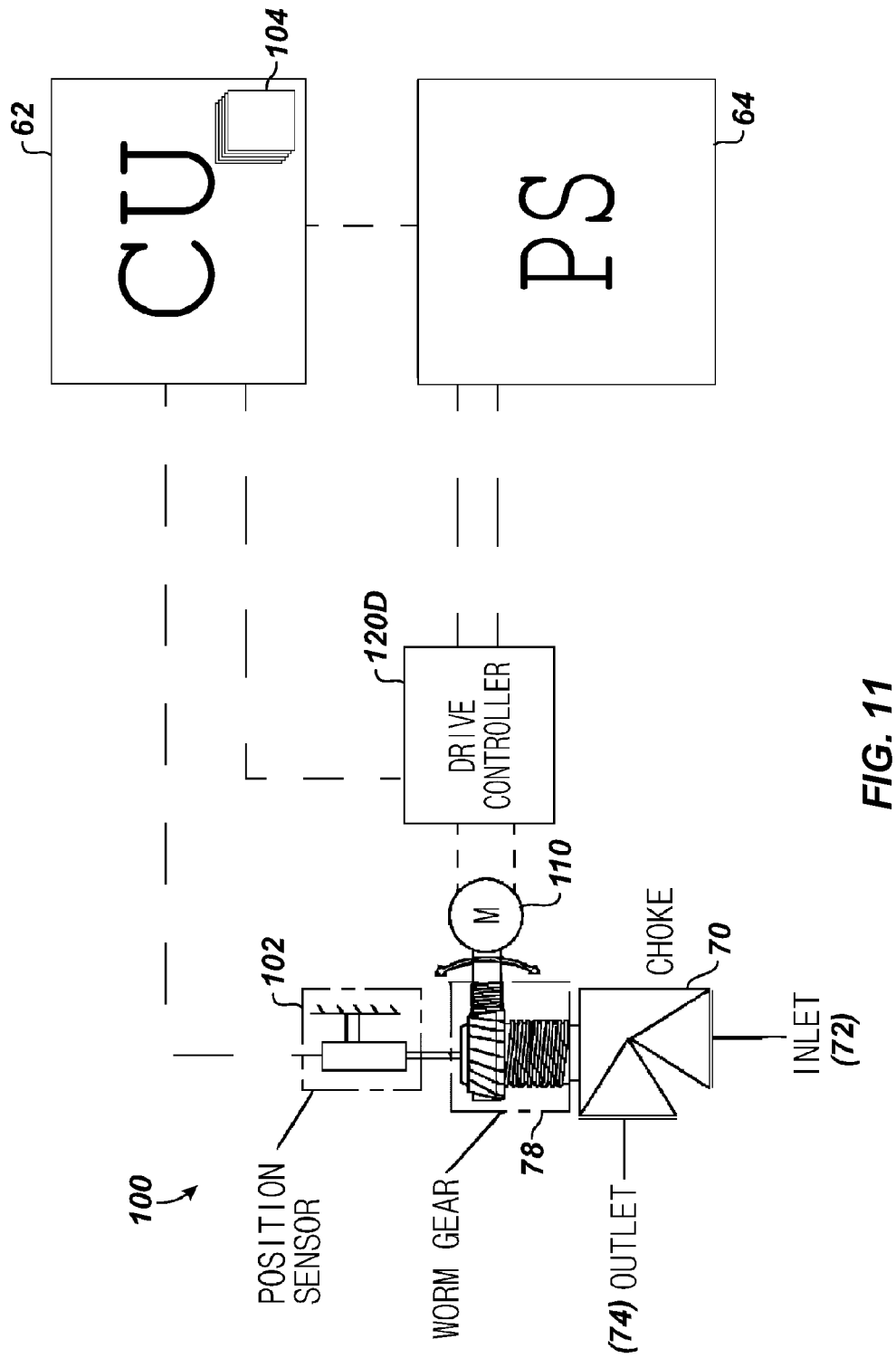
FIG. 11 illustrates an embodiment of a choke controlled by a control unit, an actuator, a position sensor, and a fifth non-linear transfer mechanism according to the present disclosure.

FIG. 11 illustrates a related configuration where a non-linear transfer mechanism 120D includes a drive controller coupled between an electric motor 110 as the actuator and a power supply 64 as the power source. Here, the control unit 62 uses one or more control algorithms 104 that send control signals to the drive controller 120D coupled with the electric motor 110. (If more than one control algorithm 104 is available, selection of a particular control algorithm 104 can be performed by the control unit 62 based on calibration, operating parameters, etc.). The controlled drive from the signals causes the electric motor 110 to speed up and slow down the motor revolutions according to feedback coming from the position sensor 102. Accordingly, these signals for controlling the speed of motor revolutions can be used to slow the closing speed of the internal trim (e.g., gate 76) in the choke 70 when near a fully closed position.

Figure 12:
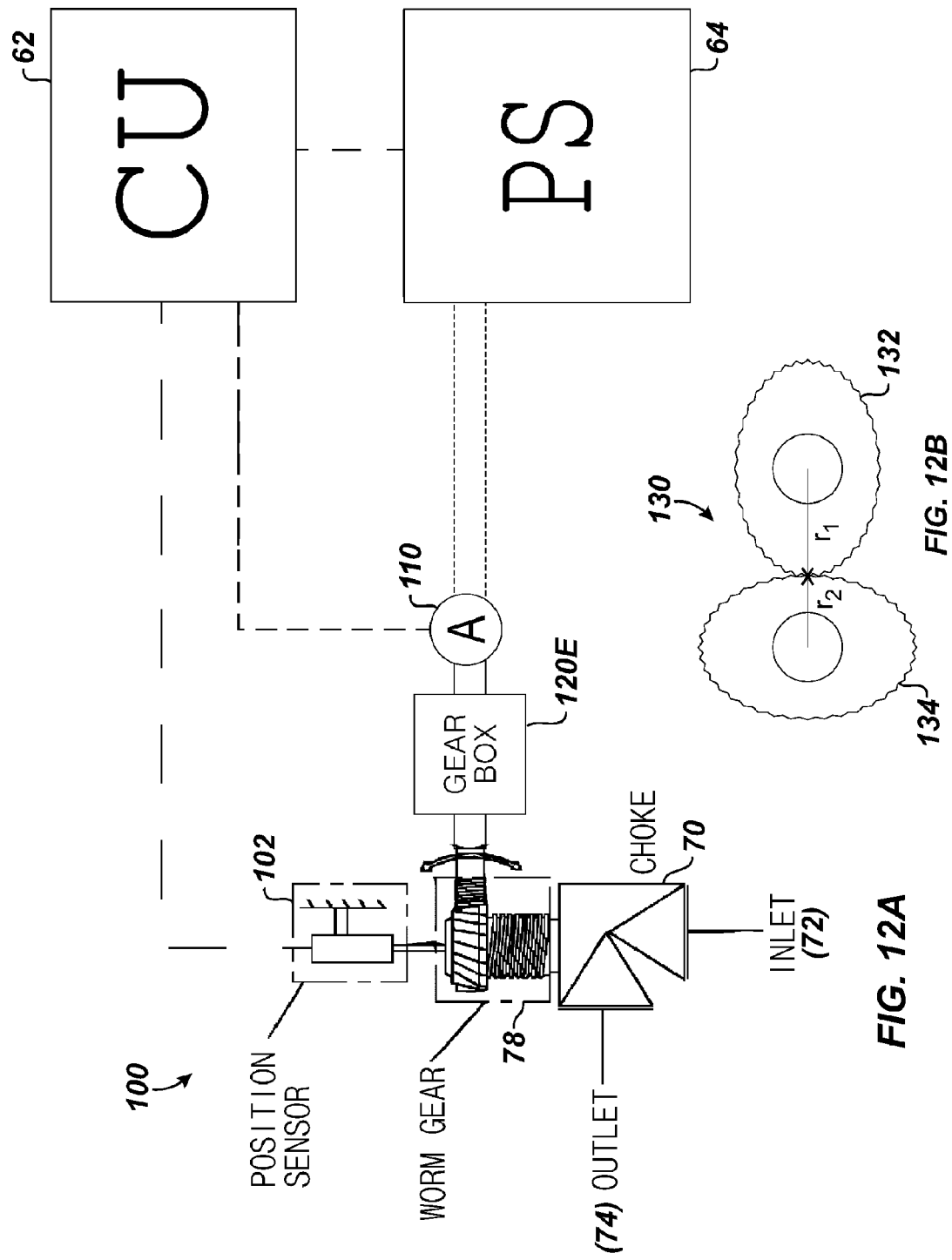
FIG. 12A illustrates an embodiment of a choke controlled by a control unit, an actuator, a position sensor, and a sixth non-linear transfer mechanism according to the present disclosure.
FIG. 12B illustrates a detail of an example of elliptical gears for the mechanism of FIG. 12A.

In the embodiments of FIGS. 11-12B, the overall closing time of the choke's gate (76) can remain constant according to its particular design. However, the speed of the hydraulic or electric motor 110 driving the choke's gate (76) can be changed over time to allow a more linearized pressure over time profile near the closed position. As such, the closing speed can be adjusted to mimic what is graphed in FIG. 6B to produce better control of the resulting pressure drop similar to what is graphed in FIG. 6A.

Another non-linear transfer mechanism 120E according to the present disclosure shown in FIG. 12A can use a gear arrangement coupled between the actuator 110 and the choke 70. For example, the actuator 110 can be a hydraulic or electric motor that couples by a worm gear arrangement 78 to the choke 70 so that rotation of the motor 110 transfers to reciprocal movement of the internal trim or flow restrictor (not shown) in the choke 70. The gear arrangement 120E alters the transfer of the rotation in a non-linear fashion. For example, the gear arrangement 120E can use a pairing of variable radii and/or variable pitch gears.

As shown in FIG. 12B, an example of a pair 130 of variable radii gears can include elliptical gears 132, 134. Using the pair 130 of the elliptical gears 132, 134 can change the rotational speed of the output gear 134 relative to the input gear 132, which would add more resolution to the control unit 62 as the internal trim in the choke 70 approaches the closed position.

As will be appreciated with the benefit of the present disclosure, other gear mechanisms can be used for the transfer mechanisms of the present disclosure. An arrangement having a chain between elliptical sprockets could be used in a manner similar to the planetary gears. Similarly, a continuously variable transmission can be used to make the transfer in the non-linear relationship.

Figure 13:
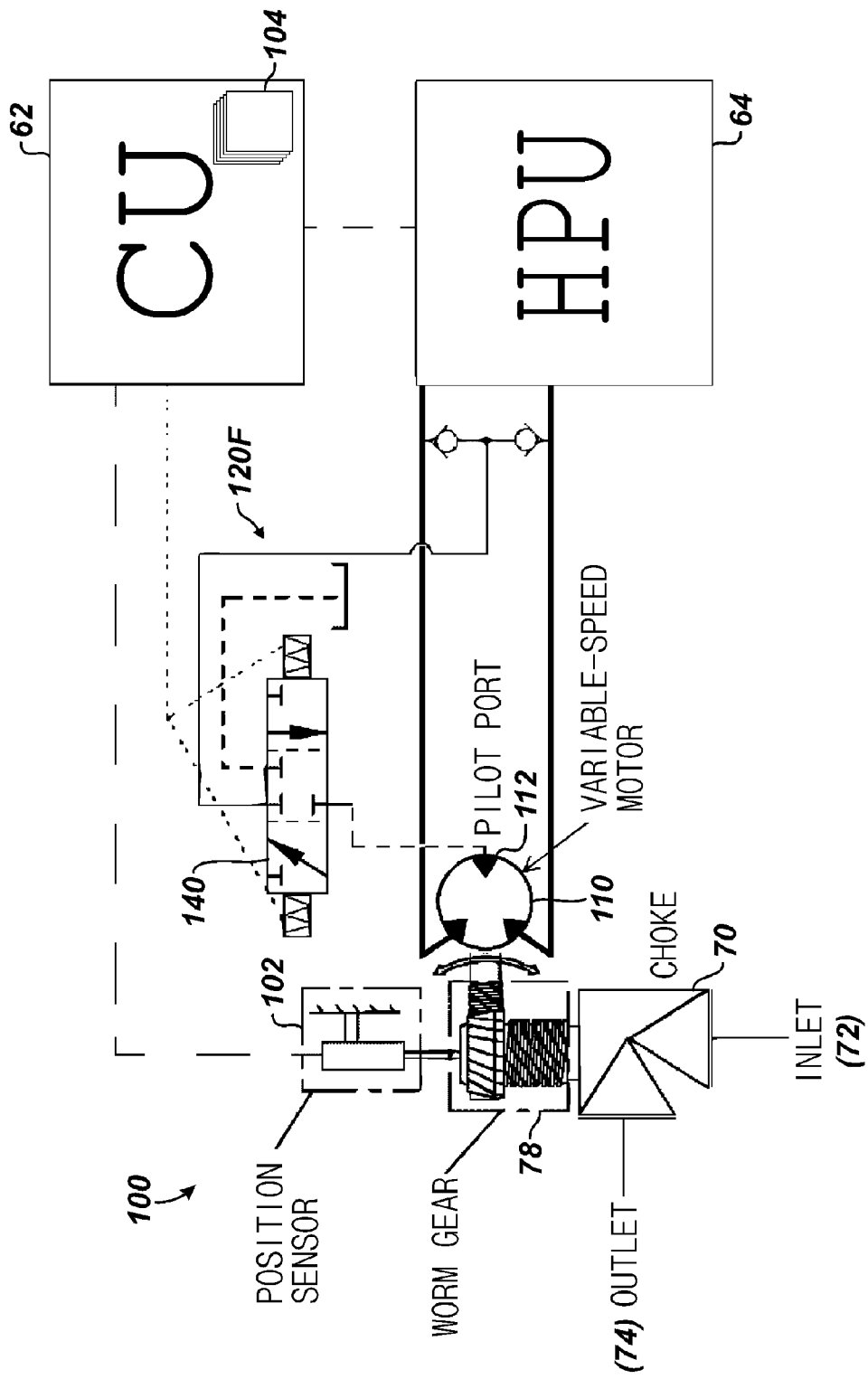
FIG. 13 illustrates an embodiment of a choke controlled by a control unit, an actuator, a position sensor, and a seventh non-linear transfer mechanism according to the present disclosure.

Another operational device 100 depicted in FIG. 13 for operating a choke 70 includes a position sensor 102, an actuator 110, and a non-linear transfer mechanism 120F according to the present disclosure. The actuator 110 is a hydraulic motor 110 with built-in variable speed. The variable speed motor 110 has a pilot port 112 accessed via a control valve 140 to actuate an internal mechanism in the motor 110 and change the required displacement of hydraulic fluid per revolution.

The control unit 62 uses one or more control algorithms 104 that send control signals to the control valve 140 coupled between the hydraulic power unit 64 and the pilot port 112 of the variable speed motor 110. (If more than one control algorithm 104 is available, selection of a particular control algorithm 104 can be performed by the control unit 62 based on calibration, operating parameters, etc.). The control valve 140 can be a solenoid operated three-way valve, as shown. The controlled pilot feed from the control valve 140 causes the variable speed motor 110 to speed up and slow down according to feedback coming from the position sensor 102. Accordingly, this control for controlling the speed of motor revolutions can be used to slow the closing speed of the internal trim or flow restrictor in the choke 70 when near a fully closed position. This configuration allows for finer control of the choke 70 at select positions based on feedback from the position sensor 102. The variable speed hydraulic motor 110 can also be implemented with any combination of the aforementioned embodiments.

A combination of the previously disclosed embodiments could be used together to enhance the control capabilities of a choke 70 at critical pressures. The gear arrangement 120E of FIG. 12A can be used in conjunction with the mechanisms 120A-B of FIGS. 4A-5B or can be coupled to the motor 110 of FIGS. 8-11.

Figure 14:
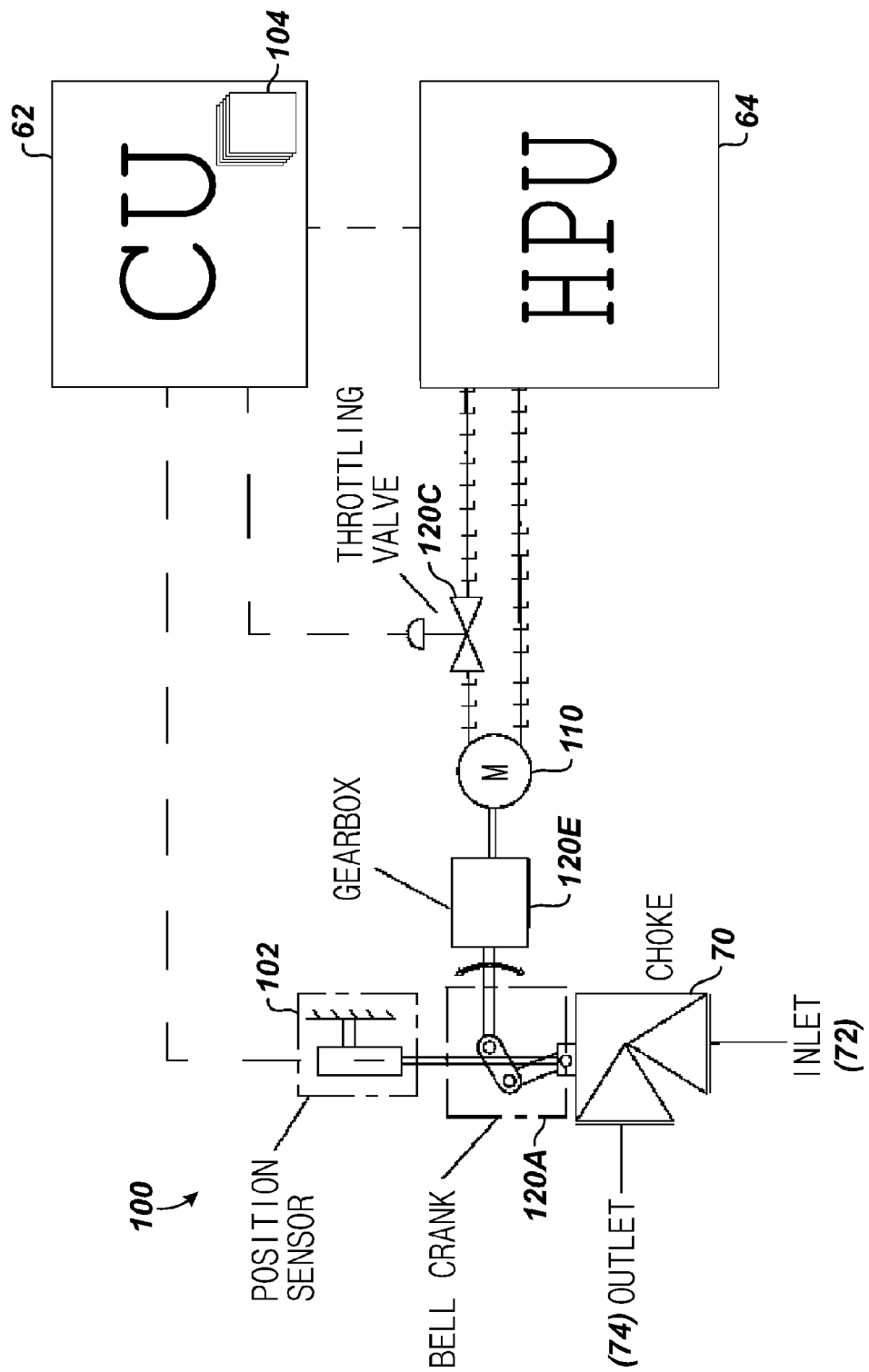
FIG. 14 illustrates an embodiment of a choke controlled by a control unit, an actuator, a position sensor, and a combination of non-linear transfer mechanisms according to the present disclosure.

As one particular example, FIG. 14 illustrates a choke 70 controlled by a control unit 62 and a hydraulic power unit 64 as the power source. The actuator 110 is a hydraulic motor in communication with the hydraulic power unit 64. A combination of the non-linear transfer mechanisms 120A-E of FIG. 4A through FIG. 12B can used to transfer/control the actuation. In particular, a bell crank mechanism 120A as in FIGS. 4A-4B is coupled between the motor 110 and the choke 70 for adjusting motion of the choke's gate (76), and a gear box 120E having gears as in FIG. 12A is coupled between the bell crank mechanism 120A and the motor 110. The gear box 120E coupled between the motor 110 and the rotating arm of the mechanism 120A can alter the number of motor revolutions to move the gate (76) between fully-open to fully-closed in order to refine control as desired.

Finally, a hydraulic throttling valve 120C as in FIG. 8 can be operable between the power unit 64 and the hydraulic motor 110. One or more control algorithms 104 may be used by the control unit 62 to control the throttling valve 120C. The bell crank mechanism 120B and gear box 120E have a fixed transfer relationship built into the mechanics of the mechanisms. By contrast, the throttling valve 120C can have a selective transfer relationship based on the control algorithm used. As will be appreciated, these and other combinations of the various mechanisms 120 disclosed herein can be used for controlling the choke 70.

The additional precision for the control system comes from a built-in mechanical component, or software algorithm or combination of the two that causes the choke's internal trim, gate or flow restrictor (76) to move more slowly as it nears the closed position. The use of an entirely mechanical device 100 to provide the additional range of control in some examples removes the need to have extra electrical components and software algorithms added to the design.

Although disclosed herein as applying to automated designs using powered actuation for a choke from a power source such as a hydraulic power unit or electric power supply, a manually operated choke can also benefit from the non-linear transfer mechanisms of the present disclosure. This may be especially evident for the mechanical assemblies disclosed herein where the rotational input R (see FIGS. 4A & B) or the linear input L (see FIGS. 5A & B) is provided by a manual device operated by personnel.

Figure 15:
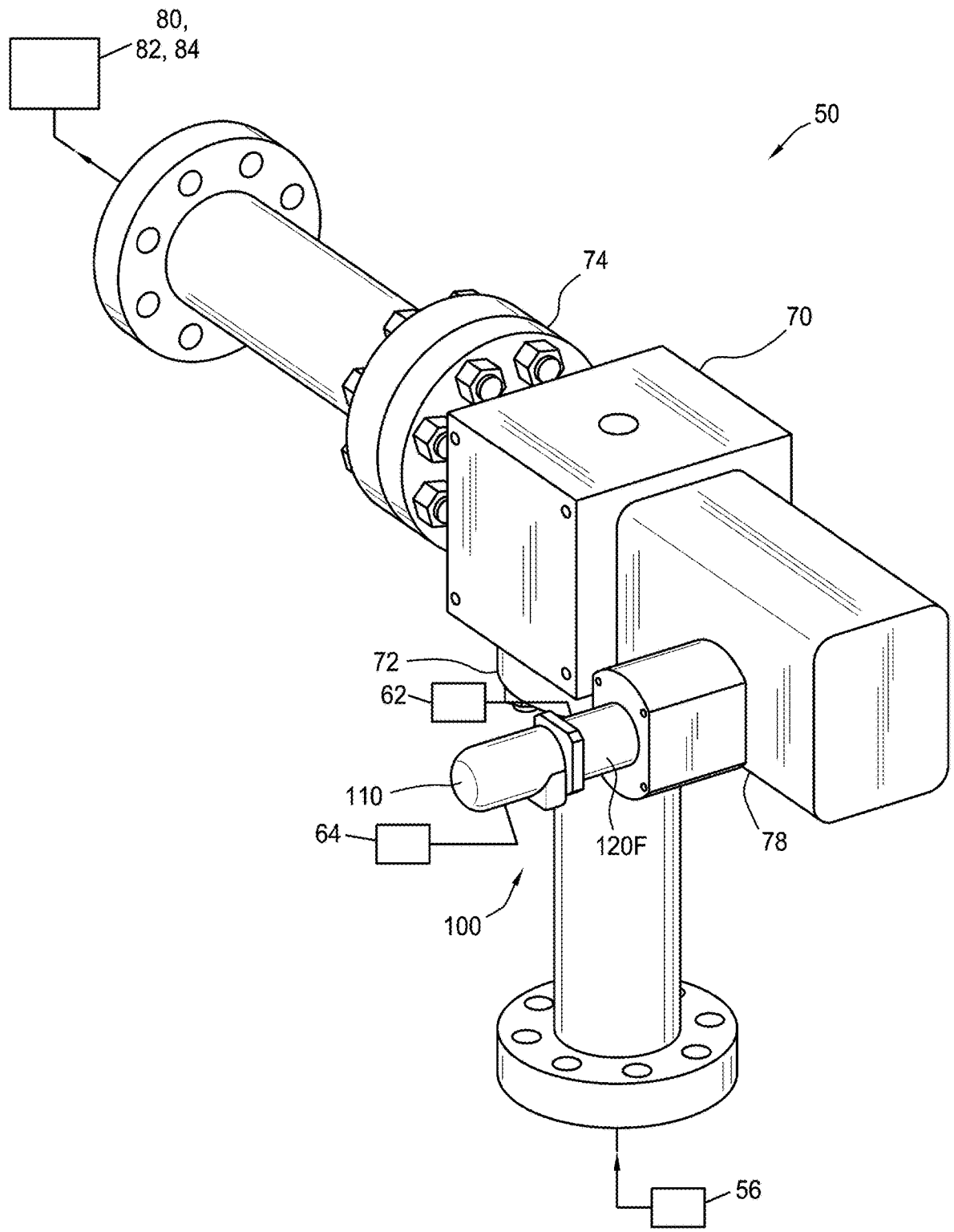
FIG. 15 is a representative perspective view of another example of the drilling system.

Representatively illustrated in FIG. 15 is a portion of another example of the drilling system 50 which can embody principles of this disclosure. The choke 70 is depicted as being connected between the wellbore 56 and the mud gas separator 80, mud tanks 82 and rig pumps 84, as in the example of FIG. 2A. However, the scope of this disclosure is not limited to use of a choke connected between a wellbore and a mud gas separator, mud tanks and rig pumps. Instead, any of the chokes 70 described herein may be connected between a variety of other types of equipment.

The operational device 100 used to operate the choke 70 in the FIG. 15 example includes a non-linear transfer mechanism 120F which transfers motion from the actuator 110 to the worm gear arrangement 78. The actuator 110 in this example is a motor (such as, an electric or hydraulic motor) which is operatively connected to the power source 64 and produces a rotational input R to the transfer mechanism 120F. Other types of actuators may be used in keeping with the scope of this disclosure.

The worm gear arrangement 78 could be replaced, for example, by a bell crank mechanism (such as, the mechanism 120A) or another type of mechanism, or combination of mechanisms. In other examples, a separate mechanism may not be used between the transfer mechanism 120F and the choke 70.

In the FIG. 15 example, the transfer mechanism 120F comprises a continuously variable transmission (CVT). The CVT transfers motion from the actuator 110 to the choke 70 (via the worm gear arrangement 78 in this example) in a non-linear manner. Preferably, a rate of actuation of the choke 70 (such as, a speed of displacement of the internal trim or flow restrictor 76 of the choke, see FIGS. 4A-5B) is slower when the choke is proximate its closed or most flow restrictive position or configuration, than when the choke is proximate its open or least flow restrictive position or configuration.

Operation of the CVT is controlled by the control unit 62 which, as described above, can include one or more control algorithms 104 (see FIGS. 8, 11, 13 & 14). In this example, the control algorithm 104 is adapted to send control signals to the transfer mechanism 120F. (If more than one control algorithm 104 is available, selection of a particular control algorithm 104 can be performed by the control unit 62 based on calibration, operating parameters, etc.). The signals cause the transfer mechanism 120F to speed up and slow down the rotational speed transferred to the worm gear arrangement 78 by changing an effective gear ratio of the CVT according to feedback coming from the position sensor 102 (see FIGS. 8, 11, 12A, 13 & 14). Accordingly, these signals for controlling the effective gear ratio of the CVT can be used to slow the closing speed of the internal trim, gate or flow restrictor 76 in the choke 70 when near the fully closed position.

The overall closing time of the choke's gate or flow restrictor 76 can remain constant according to its particular design. However, the speed of the rotational input R from the transfer mechanism 120F to the worm gear arrangement 78 driving the choke's flow restrictor 76 can be changed over time in response to the control signals, in order to allow a more linearized pressure over time profile near the closed position. For example, the closing speed can be adjusted to mimic what is graphed in FIG. 6B to produce better control of the resulting pressure drop, similar to what is graphed in FIG. 6A.

Figure 16:
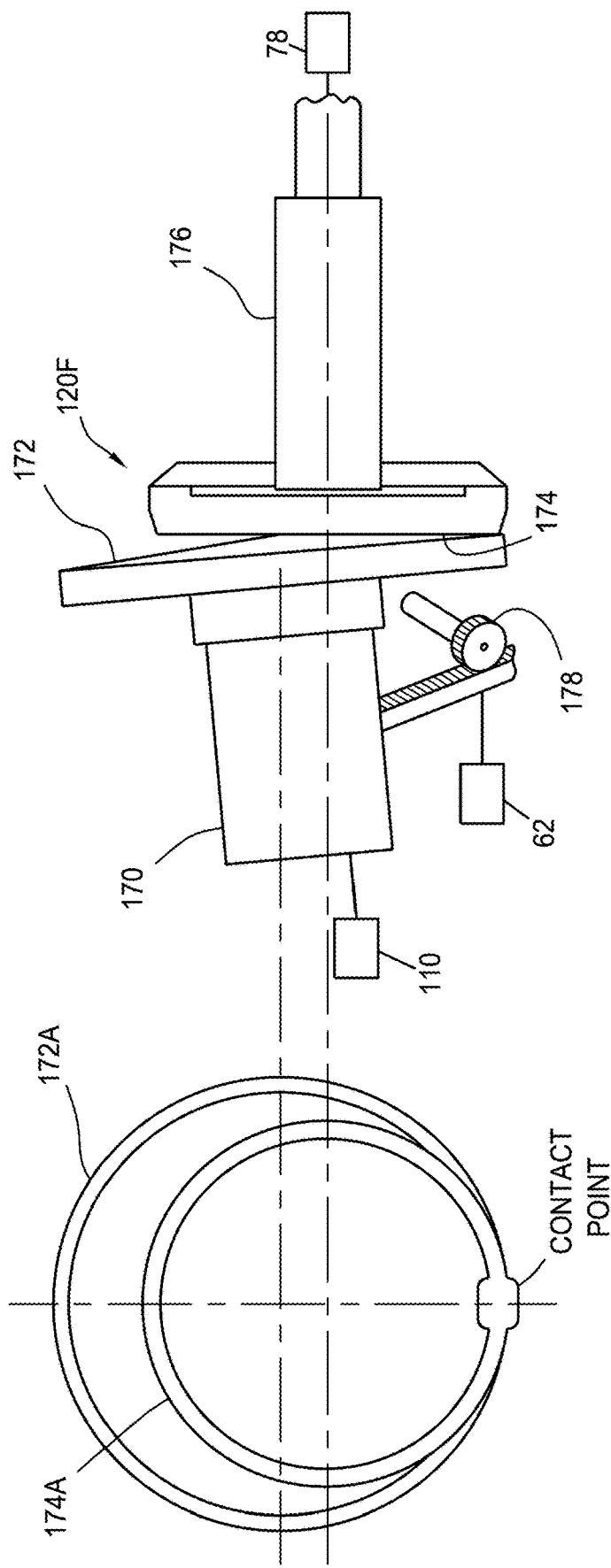
FIG. 16 is a representative side view of an example of internal components of a non-linear transfer mechanism that may be used in the drilling system, with an end view projection of peripheries of contact surfaces of the internal components in an increased actuation rate configuration.

Referring additionally now to FIG. 16, an example of internal components of the non-linear transfer mechanism 120F is representatively illustrated. In FIG. 16, an effective gear ratio of the transfer mechanism 120F is relatively high (in this example, a rotational output speed is greater than a rotational input speed). The transfer mechanism 120F may be in this relatively high gear ratio configuration when the flow restrictor 76 of the choke 70 is near its fully open or least flow restrictive position.

As depicted in FIG. 16, an input shaft 170 receives a rotational input from the actuator 110. A radially enlarged generally conical contact surface 172 is formed on (or secured to) an end of the input shaft 170. The contact surface 172 is in frictional contact with a radially enlarged generally planar contact surface 174 formed on (or secured to) an end of an output shaft 176. The output shaft 176 is connected to and provides a rotational output to the worm gear arrangement 78.

Also depicted in FIG. 16 are outer peripheries 172A & 174A of the respective contact surfaces 172, 174. At a Contact Point, rotational displacement of the input and output shafts 170, 176 are the same. In the FIG. 16 configuration, the Contact Point is at or near the outer peripheries 172A & 174A of the contact surfaces 172, 174. However, since a radius of the contact surface 174 is less than a radius of the contact surface 172, the rotational speed of the output shaft 176 will be greater than a rotational speed of the input shaft 170.

In the FIG. 16 example, the position of the Contact Point can be varied by means of a rack and pinion arrangement 178. Operation of the rack and pinion arrangement 178 can be controlled by control signals from the control system 62, for example, in response to the output from the position sensor 102. Thus, the control signals can cause the rack and pinion arrangement 178 to place the transfer mechanism 120F in the FIG. 16 configuration (such as, by operating a motor or other type of actuator (not shown) connected to a pinion of the arrangement 178) when the position sensor 102 indicates that the flow restrictor 76 is near its fully open or least flow restrictive position.

Figure 17:
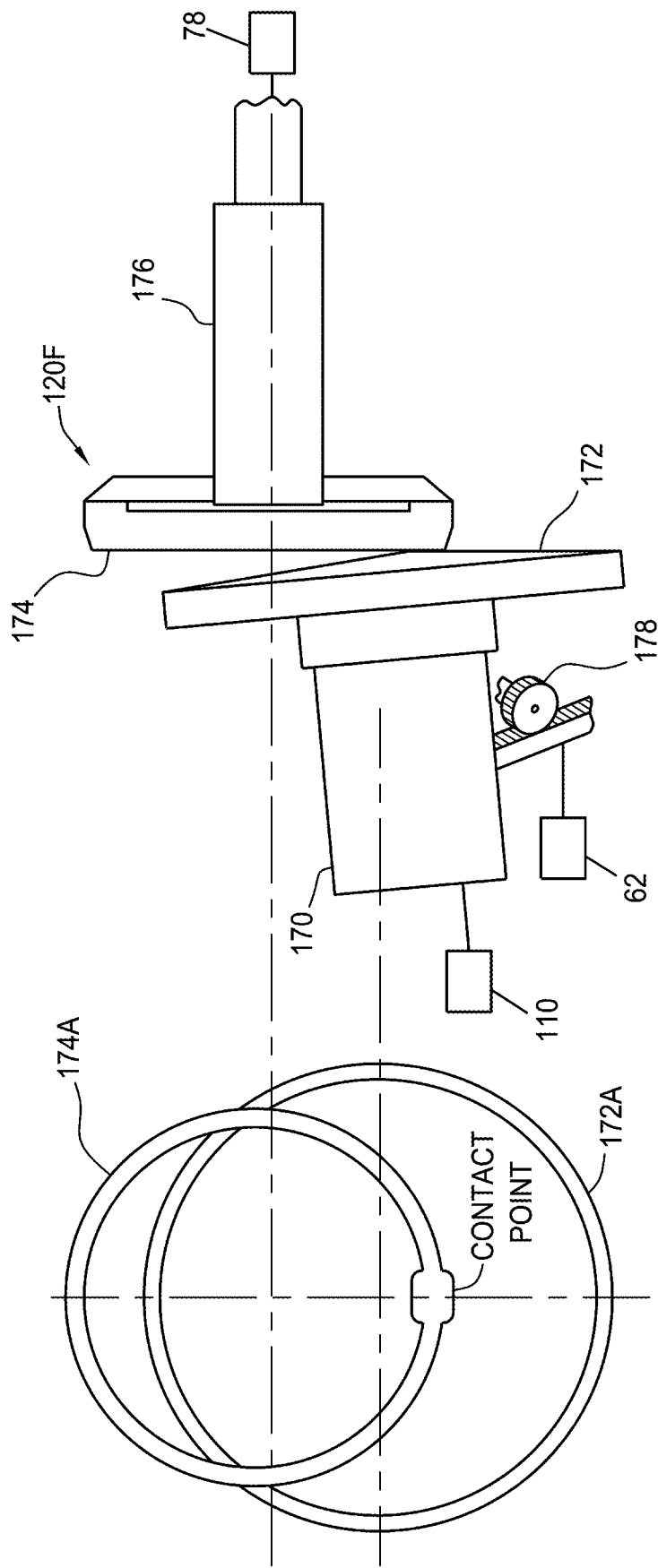
FIG. 17 is a representative side view of the internal components, with an end view projection of the peripheries of the contact surfaces in a reduced actuation rate configuration.

Referring additionally now to FIG. 17, the internal components of the non-linear transfer mechanism 120F are representatively illustrated in a relatively reduced effective gear ratio configuration. In the FIG. 17 configuration, the Contact Point is at or near the outer periphery 174A of the contact surface 174, and near a center of the contact surface 172. Thus, the rotational speed of the output shaft 176 will be less than a rotational speed of the input shaft 170.

The position of the Contact Point has been varied (compared to the FIG. 16 configuration) by operation of the rack and pinion arrangement 178 in response to the control signals from the control system 62, which are produced in response to the output from the position sensor 102. Thus, the control signals cause the rack and pinion arrangement 178 to place the transfer mechanism 120F in the FIG. 17 configuration (such as, by operating the motor or other type of actuator (not shown) connected to the pinion of the arrangement 178) when the position sensor 102 indicates that the flow restrictor 76 is near its fully closed or most flow restrictive position.

In this manner, the position of the flow restrictor 76 in the choke 70 can be more precisely adjusted near the fully closed or most flow restrictive position of the flow restrictor. Stated differently, more rotational output from the actuator 110 is required to produce a given displacement of the flow restrictor 76 when the flow restrictor is nearer its fully closed or most flow restrictive position. An actuation rate (e.g., displacement speed of the flow restrictor 76, or change in position per given actuator output, or rate of change of the choke Cv) is relatively slow, therefore, when the flow restrictor is nearer its fully closed or most flow restrictive position.

In addition, the control unit 62 can adjust the rack and pinion arrangement 178, so that less rotational output from the actuator 110 is required to produce a given displacement of the flow restrictor 76 when the flow restrictor is nearer its fully open or least flow restrictive position. An actuation rate (e.g., displacement speed of the flow restrictor 76, or change in position per given actuator output, or rate of change of the choke Cv) is relatively fast, therefore, when the flow restrictor is nearer its fully open or least flow restrictive position.

Between the closed/most restrictive and open/least restrictive positions, the effective gear ratio of the transfer mechanism 120F can be continuously varied by the control unit 62 via the rack and pinion arrangement 178. Note that use of the rack and pinion arrangement 178 is not necessary in keeping with the scope of this disclosure, since other types of actuation mechanisms may be used instead to vary the relative positions of the contact surfaces 172, 174.

The position of the flow restrictor 76 in the choke 70 influences the flow coefficient Cv of the choke. The flow coefficient Cv is given by the well-known equation:

$$Cv = Q*(SG/dP)^{1/2} \qquad (1)$$

where Q is the fluid flow rate, SG is the specific gravity of the fluid, and dP is the differential pressure across the choke.

At the fully open or least flow restrictive position of the flow restrictor 76, the Cv of the choke 70 will generally be at or near a maximum value. Conversely, at the fully closed or most flow restrictive position of the flow restrictor 76, the Cv of the choke 70 will generally be at or near a minimum value.

In one example of a managed pressure drilling application (such as, depicted in FIG. 2A), a CVT 120F is connected between the actuator 110 and the choke 70 (such as, via the worm gear arrangement 78). A feedback loop is created with the control system 60 using the output of the position sensor 102 to gradually change to the relatively low gear ratio configuration of FIG. 17 while the choke flow restrictor 76 approaches a low Cv configuration of the choke (e.g., with the flow restrictor proximate its closed or most flow restrictive position). This provides an increase in sensitivity while holding higher pressure in the wellbore 56 at low flow rates. The CVT 120F can also be used to address other issues encountered while drilling that can generally create unwanted spikes in downhole pressure (such as, when cycling out debris from the choke 70).

In a variety of different examples, the gear ratio of the CVT 120F can be changed either manually or with an automated feedback loop as described above. The output speed of the CVT 120F can be reduced as the choke 70 nears the closed or minimal Cv position. The CVT 120F, thus, provides a narrower pressure control window when the choke 70 is in its optimal control range.

Figure 18:
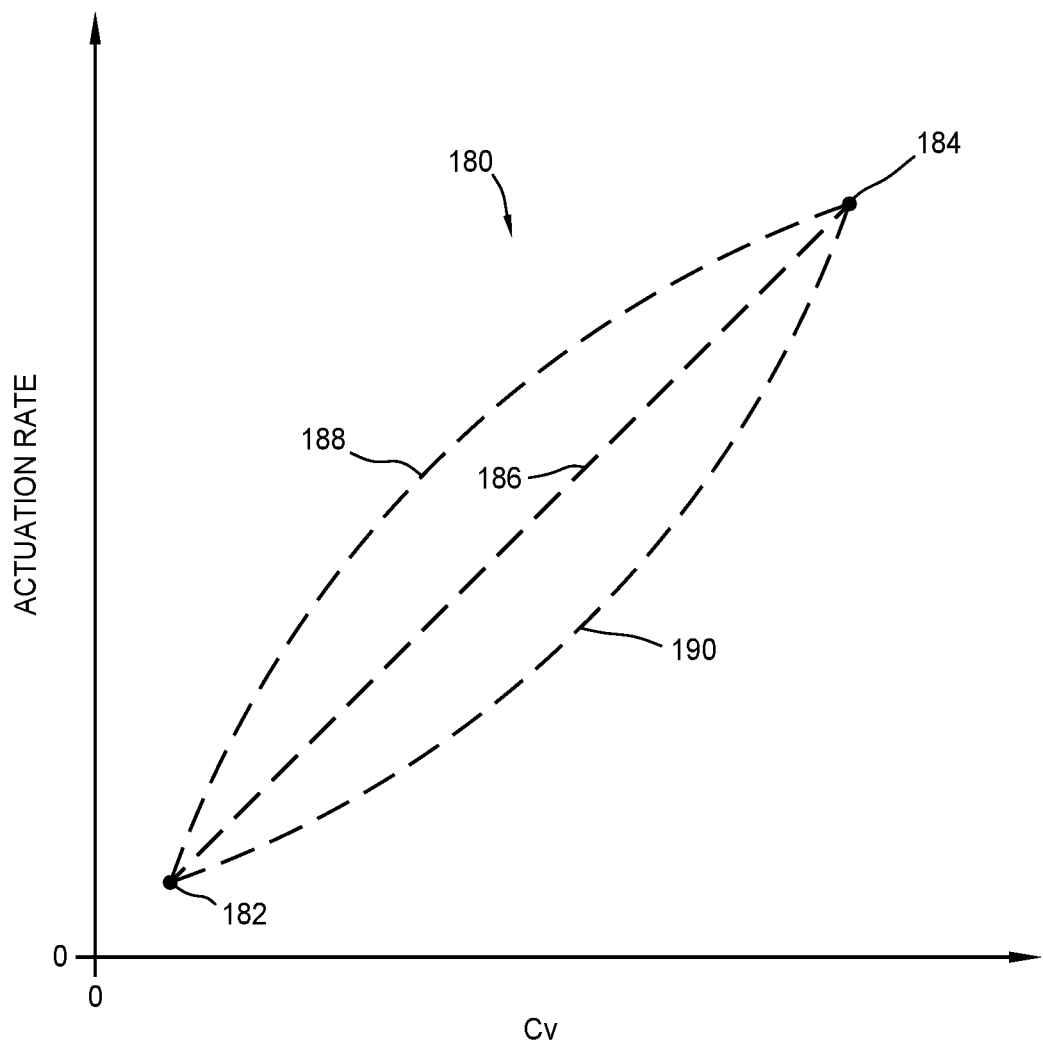
FIG. 18 is a representative graph of an example of actuation rate versus flow coefficient Cv of the choke.

Referring additionally now to FIG. 18, an example of a graph 180 of actuation rate versus flow coefficient Cv is representatively illustrated. Two points 182, 184 are indicated on the FIG. 18 graph 180. The point 182 corresponds to a position of the flow restrictor 76 at or near its fully closed or most flow restrictive position. The point 184 corresponds to a position of the flow restrictor 76 at or near its fully open or least flow restrictive position.

At the point 182, the Cv of the choke 70 is relatively low (since the flow rate Q through the choke 70 is reduced and the differential pressure dP across the choke is increased), and the actuation rate is relatively low, as compared to the point 184. The rate of change of the Cv is relatively low at the point 182, corresponding to the relatively low actuation rate. At the point 184, the Cv of the choke 70 is relatively high (since the flow rate Q through the choke 70 is increased and the differential pressure dP across the choke is decreased), and the actuation rate is relatively high, as compared to the point 182. The rate of change of the Cv is relatively high at the point 184, corresponding to the relatively high actuation rate.

Between the points 182, 184, the effective gear ratio of the transfer mechanism 120F can be continuously varied by the control unit 62, so that there is a linear relationship between the actuation rate and the choke Cv, as indicated by the dashed line 186 in the FIG. 18 graph 180. Alternatively, the control unit 62 can vary the gear ratio of the transfer mechanism 120F, so that there is a non-linear relationship between the actuation rate and the choke Cv between the points 182, 184, as indicated by the dashed curves 188, 190 in the graph 180.

The transfer mechanism 120F may be used in place of, or in combination with, any of the other transfer mechanisms 120A-E described above. Accordingly, any of the operational devices 100 described above can be controlled (e.g., using the control unit 62 and control algorithm 104), so that the actuation rate of the choke 70 is reduced as the flow restrictor 76 displaces toward its fully closed, most flow restrictive or minimum Cv position. The actuation rate (and, thus, the rate of change of the Cv) of the choke 70 can be increased as the flow restrictor 76 displaces toward its fully open, least flow restrictive or maximum Cv position. The actuation rate (and, thus, the rate of change of the Cv) can be reduced as the choke Cv decreases, and the actuation rate can be increased as the choke Cv increases.

It may now be fully appreciated that the above disclosure provides significant advancements to the art of controlling operation of a choke, such as a drilling choke or a valve capable of variably restricting fluid flow. In examples described herein, an actuation rate or rate of change of a flow coefficient Cv of the choke 70 can be varied based at least in part on a position of a flow restrictor 76 of the choke. As the flow restrictor 76 displaces toward a fully closed or most flow restrictive position (with a corresponding decreased Cv), the rate of change of the flow coefficient Cv can be decreased to provide for enhanced precision of adjustment of the flow coefficient Cv.

An apparatus for use with a subterranean well is provided to the art by the above disclosure. In one example, the apparatus can include: a choke 70 comprising a flow restrictor 76 having at least first and second positions (e.g., corresponding to points 182, 184), a flow coefficient Cv of the choke 70 with the flow restrictor 76 in the first position being less than the flow coefficient Cv of the choke 70 with the flow restrictor 76 in the second position; and an operational device 100 configured to displace the flow restrictor 76 between the first and second positions at a variable actuation rate. The actuation rate with the flow restrictor 76 in the first position being less than the actuation rate with the flow restrictor 76 in the second position.

The operational device 100 may comprise a non-linear transfer mechanism 120 connected between the choke 70 and an actuator 110. The non-linear transfer mechanism 120 may comprise a continuously variable transmission 120F.

A control unit 62 may be operatively connected to the operational device 100. The control unit 62 may comprise a control algorithm 104 adapted to vary an effective gear ratio of the continuously variable transmission 120F as the flow restrictor 76 is displaced between the first and second positions. The control algorithm 104 may be adapted to vary a rate of change of the flow coefficient Cv as the flow restrictor 76 is displaced between the first and second positions. The control algorithm 104 may be adapted to reduce the rate of change of the flow coefficient Cv as the flow restrictor 76 is displaced toward the first position.

A restriction to flow through the choke 70 with the flow restrictor 76 in the first position may be greater than a restriction to flow through the choke 70 with the flow restrictor 76 in the second position.

A method is also provided to the art by the above disclosure. In one example, the method may comprise: displacing a flow restrictor 76 of a choke 70, thereby decreasing a flow coefficient Cv of the choke 70; and decreasing a rate of change of the flow coefficient Cv in response to the step of decreasing the flow coefficient Cv of the choke 70.

The step of displacing the flow restrictor 76 of the choke 70 may comprise operating an actuator 110 and a non-linear transfer mechanism 120 connected to the choke 70. The step of operating the non-linear transfer mechanism 120 may comprise varying a gear ratio of the non-linear transfer mechanism 120.

The non-linear transfer mechanism 120 may comprise a continuously variable transmission 120F. The step of operating the non-linear transfer mechanism 120 may comprise displacing a first contact surface 172 of the continuously variable transmission 120F relative to a second contact surface 174 of the continuously variable transmission 120F.

The method may include displacing the flow restrictor 76, thereby increasing the flow coefficient Cv of the choke 70; and increasing the rate of change of the flow coefficient Cv in response to the step of increasing the flow coefficient Cv of the choke 70.

The step of decreasing the rate of change of the flow coefficient Cv may include varying a gear ratio of a continuously variable transmission 120F connected to the choke 70.

A drilling system 50 for use with a subterranean wellbore 56 is also described above. In one example, the drilling system 50 can include: a choke 70 configured to variably restrict fluid flow, the choke 70 comprising a flow restrictor 76; an actuator 110; and a continuously variable transmission 120F connected between the actuator 110 and the choke 70. The continuously variable transmission 120F is configured to cause an actuation rate to vary based on a position of the flow restrictor 76.

The drilling system 50 may include a control unit 62 configured to control operation of the continuously variable transmission 120F so that the actuation rate decreases as a restriction of the fluid flow increases.

The drilling system 50 may include a control unit 62 configured to control operation of the continuously variable transmission 120F so that the actuation rate decreases as a flow coefficient Cv of the choke 70 decreases.

The drilling system 50 may include a position sensor 102 which senses the position of the flow restrictor 76. An effective gear ratio of the continuously variable transmission 120F may be variable based on an output of the position sensor 102.

An inlet 72 of the choke 70 may be configured to receive the fluid flow from the wellbore 56. An outlet 74 of the choke 70 may be connected upstream of at least one rig pump 84.

The continuously variable transmission 120F may be configured to decrease a rate of change of a flow coefficient Cv of the choke 70 as the flow coefficient Cv decreases.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. An apparatus for use with a subterranean well, the apparatus comprising:
   a choke comprising a flow restrictor which is displaceable between a closed position and a fully open position; and
   an actuator configured to displace the flow restrictor between the closed and fully open positions at a variable actuation rate by variation of a rotational speed of the actuator based on a position of the flow restrictor, in which the rotational speed of the actuator is slower when the flow restrictor is proximate the closed position than when the flow restrictor is proximate the fully open position.

2. The apparatus of claim 1, in which the actuator comprises a variable speed motor.

3. The apparatus of claim 2, further comprising a control unit operatively connected to the variable speed motor, the control unit comprising non-transitory computer readable instructions adapted to vary a rotational speed of the motor as the flow restrictor is displaced between the closed and fully open positions.

4. The apparatus of claim 1, in which the actuator comprises a continuously variable transmission (CVT).

5. The apparatus of claim 4, further comprising a control unit operatively connected to the continuously variable transmission, the control unit comprising non-transitory computer readable instructions adapted to displace a first contact surface of the continuously variable transmission relative to a second contact surface of the continuously variable transmission as the flow restrictor is displaced between the closed and fully open positions.

6. The apparatus of claim 4, further comprising a control unit operatively connected to the continuously variable transmission, the control unit comprising non-transitory computer readable instructions adapted to vary an effective gear ratio of the continuously variable transmission as the flow restrictor is displaced between the closed and fully open positions.

7. The apparatus of claim 4, further comprising a control unit operatively connected to the continuously variable transmission, the control unit comprising non-transitory computer readable instructions adapted to vary a rate of change of the flow coefficient Cv as the flow restrictor is displaced between the closed and fully open positions.

8. The apparatus of claim 7, in which the non-transitory computer readable instructions are further adapted to reduce the rate of change of the flow coefficient Cv as the flow restrictor is displaced toward the closed position.

9. A method, comprising:
displacing a flow restrictor of a choke between closed and fully open positions, in which the displacing the flow restrictor of the choke comprises operating an actuator connected to the choke; and
varying a rotational speed of the actuator based on a position of the flow restrictor, in which the rotational speed of the actuator is slower when the flow restrictor is proximate the closed position than when the flow restrictor is proximate the fully open position.

10. The method of claim 9, in which the actuator comprises a variable speed motor.

11. The method of claim 10, in which the varying the rotational speed of the actuator comprises varying a speed of the motor.

12. The method of claim 9, in which the actuator comprises a continuously variable transmission (CVT).

13. The method of claim 12, in which the varying the rotational speed comprises varying an effective gear ratio of the continuously variable transmission.

14. The method of claim 12, in which the varying the rotational speed comprises displacing a first contact surface of the continuously variable transmission relative to a second contact surface of the continuously variable transmission.

15. A drilling system for use with a subterranean wellbore, the drilling system comprising:
a choke configured to variably restrict fluid flow, the choke comprising a flow restrictor which is displaceable between a closed position and a fully open position;
an actuator configured to operate the choke; and
a continuously variable transmission (CVT) connected between the actuator and the choke, the continuously variable transmission being configured to change a rotational speed based on a position of the flow restrictor, in which the rotational speed of the continuously variable transmission is slower when the flow restrictor is proximate the closed position than when the flow restrictor is proximate the fully open position.

16. The drilling system of claim 15, further comprising a control unit configured to control operation of the continuously variable transmission so that the rotational speed decreases as the flow restrictor displaces toward the closed position.

17. The drilling system of claim 15, further comprising a control unit configured to control operation of the continuously variable transmission so that the rotational speed increases as the flow restrictor displaces toward the fully open position.

18. The drilling system of claim 15, further comprising a position sensor which senses the position of the flow restrictor, an effective gear ratio of the continuously variable transmission being variable based on an output of the position sensor.

19. The drilling system of claim 15, in which an inlet of the choke is configured to receive the fluid flow from the wellbore, and an outlet of the choke is connected upstream of at least one rig pump.

20. The drilling system of claim 15, in which the continuously variable transmission is configured to decrease a rate of change of a flow coefficient Cv of the choke as the flow coefficient Cv decreases.

21. The drilling system of claim 15, further comprising a position sensor which senses the position of the flow restrictor, a first contact surface of the continuously variable transmission displacing relative to a second contact surface of the continuously variable transmission based on an output of the position sensor.

* * * * *